(12) United States Patent
Paul

(10) Patent No.: US 6,966,174 B2
(45) Date of Patent: Nov. 22, 2005

(54) INTEGRATED BYPASS TURBOJET ENGINES FOR AIR CRAFT AND OTHER VEHICLES

(76) Inventor: Marius A. Paul, 20410 Via Canarias, Yorba Linda, CA (US) 92631

( * ) Notice: Subject to any disclaimer, the term of this patent is extended or adjusted under 35 U.S.C. 154(b) by 0 days.

(21) Appl. No.: 10/383,462

(22) Filed: Mar. 6, 2003

(65) Prior Publication Data

US 2004/0025490 A1    Feb. 12, 2004

Related U.S. Application Data

(63) Continuation-in-part of application No. 10/337,032, filed on Jan. 6, 2003, and a continuation-in-part of application No. 10/292,829, filed on Nov. 12, 2002.

(60) Provisional application No. 60/405,460, filed on Aug. 23, 2002, provisional application No. 60/374,737, filed on Apr. 23, 2002, provisional application No. 60/372,618, filed on Apr. 15, 2002.

(51) Int. Cl.[7] ............................. F02C 3/14; F02K 3/02
(52) U.S. Cl. ...................... 60/226.1; 60/39.43; 60/224; 60/269
(58) Field of Search ........................... 60/39.19, 39.35, 60/39.43, 226.1, 39.34, 224, 225, 262, 263, 60/269

(56) References Cited

U.S. PATENT DOCUMENTS

| | | | |
|---|---|---|---|
| 2,404,767 A | | 7/1946 | Heppner |
| 2,514,874 A | * | 7/1950 | Kollsaman ................. 60/39.35 |
| 2,611,241 A | * | 9/1952 | Schultz ...................... 60/39.43 |
| 2,694,291 A | * | 11/1954 | Rosengart .................. 60/39.43 |
| 3,112,610 A | | 12/1963 | Jerger |
| 3,269,120 A | * | 8/1966 | Sabatiuk .................... 60/39.43 |
| 3,283,509 A | | 11/1966 | Nitsch |
| 3,603,082 A | | 9/1971 | Sneeden et al. |
| 3,606,210 A | | 9/1971 | Busby |
| 3,705,775 A | | 12/1972 | Rioux |
| 3,892,069 A | | 7/1975 | Hansford |
| 4,845,941 A | | 7/1989 | Paul |
| 4,860,537 A | | 8/1989 | Taylor |
| 5,003,766 A | | 4/1991 | Paul |
| 5,177,954 A | | 1/1993 | Paul |
| 5,341,636 A | | 8/1994 | Paul |

* cited by examiner

Primary Examiner—Louis J. Casaregola
(74) Attorney, Agent, or Firm—Richard Esty Peterson

(57) ABSTRACT

Turbojet engines and aircraft configurations for advantageous use of the turbojet engines; the turbojet engines utilizing ram air turbine units that centrifugally compress air isothermally for use in various combustion configurations designed for stoichiometric combustion, wherein a stream of by-pass ram-air jets is mixed with combustion gas jets for discharge in a common discharge nozzle.

18 Claims, 37 Drawing Sheets

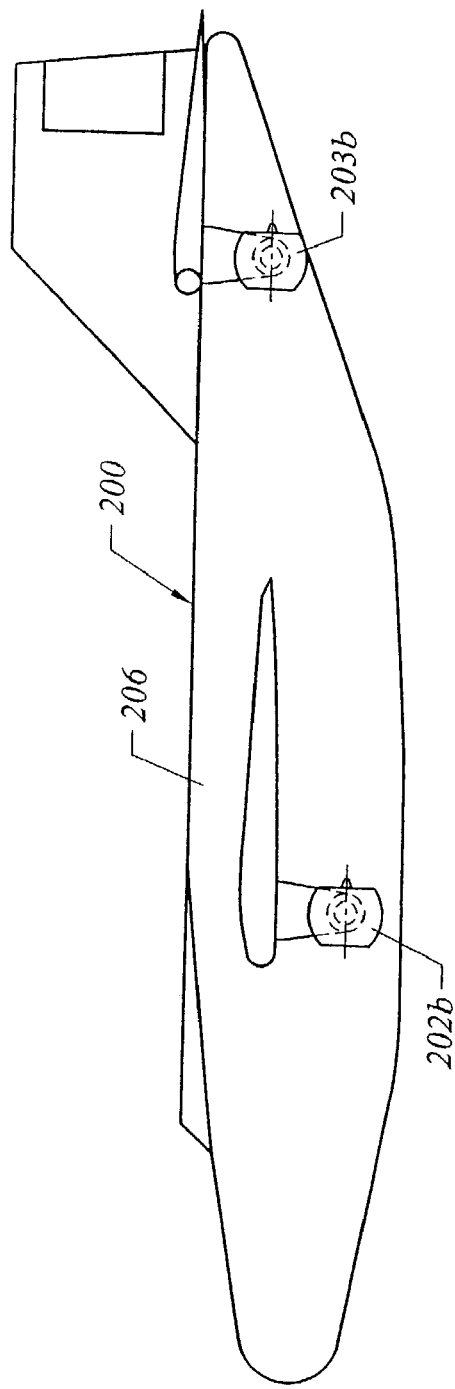
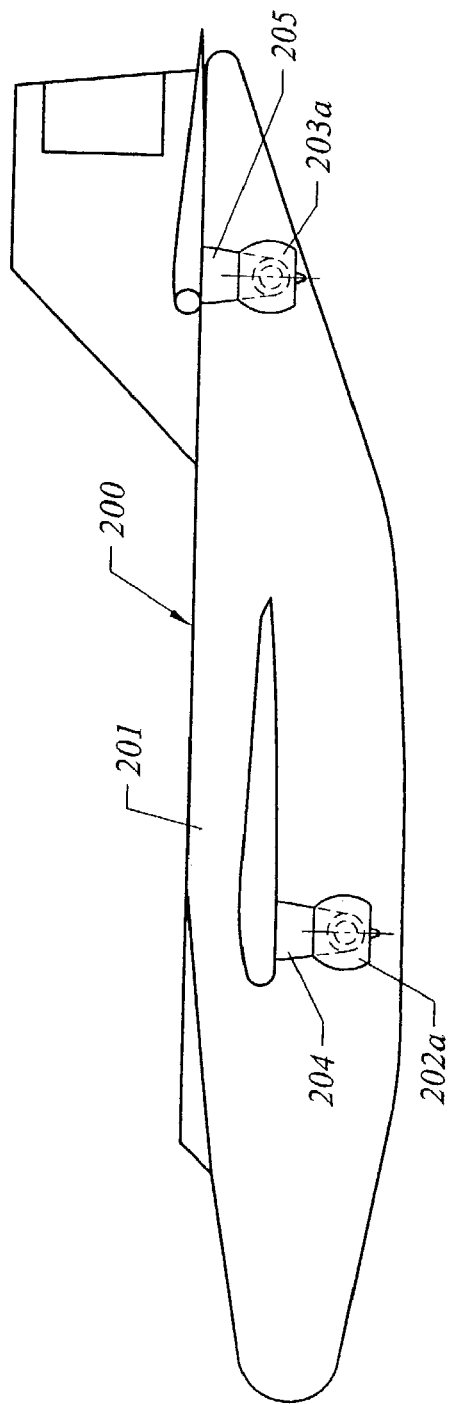

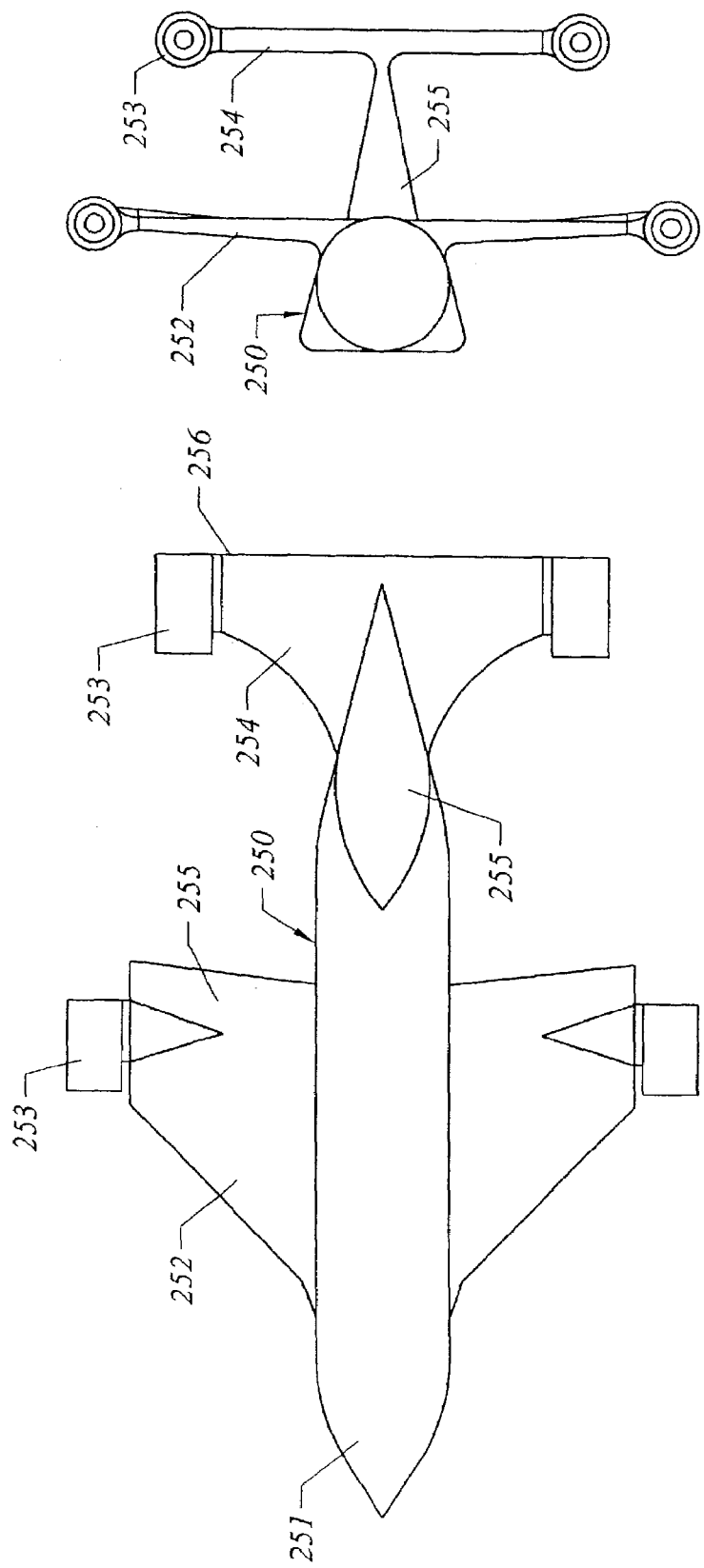

INTEGRATED BYPASS TURBOJET ENGINES FOR AIR CRAFT AND OTHER VEHICLES

This application is a continuation-in-part of applications, U.S. Ser. No. 10/337,032 filed on Jan. 6, 2003, and U.S. Ser. No. 10/292,829 filed on Nov. 12, 2002.

This application claims the benefit of the following provisional applications: U.S. Ser. No. 60/372,618 filed on Apr. 15, 2002; U.S. Ser. No. 60/374,737 filed on Apr. 23, 2002; U.S. Ser. No. 60/405,460 filed on Aug. 23, 2002.

BACKGROUND OF THE INVENTION

This invention relates to a new category of turbojet engines and the application of turbojet engines to aircraft and other vehicles. The turbojet engines are of a type in which the bypass fan blades are integrated with the compressor in association with the turbine blades that are surrounded by an annular combustion chamber. The turbojet engines of this invention are improvements over the engines described in my U.S. Pat. No. 4,845,941 entitled "Gas Turbine Engine Operating Process", issued Jul. 11, 1989, my U.S. Pat. No. 5,003,766 entitled "Gas Turbine Engine", issued Apr. 2, 1991, my U.S. Pat. No. 5,177,954 entitled "Gas Turbine Engine With Cooled Turbine Blades", issued Jan. 12, 1993, and in my U.S. Pat. No. 5,341,636 entitled "Gas Turbine Engine Operating Method", issued Aug. 30, 1994.

Conventional turbojet engines are comprised of separated modules, including bypass ducted fans, axial and centrifugal compressors, combustion chambers, and gas turbines. When assembled along a common axis the modules and components of the conventional turbojet engines combine to form an elongated engine that lacks the compactness required for many of the applications described herein.

The bypass fan is the main propulsion module and all these other modules and components cooperate to finally drive this module. The complexity of modern turbo jets has reached the maximum level, and the cost is beyond any limit of affordability by the majority of the world.

The thermal efficiency of conventional turbojets is limited to 30% at full loads and drops to near 10% at part loads.

The power density is limited by the maximum temperature of the combustion. At 25% of the maximum stoichiometric level, the air fuel ratio is 60/1, instead of a stoichiometric 15/1, making all turbojet engines at least four times larger than an engine operating at the stoichiometric level, with a resulting lower efficiency and greater expense.

For military applications, specifically drone airplanes and cruise missiles, the high cost for aircraft designed to be lost in combat is a major expense for defense and a burden on the national economy.

It is a primary object of this invention to provide a turbojet engine of high efficiency that combines isothermic compression of a part of the intake air in hollow fan blades for stoichiometric combustion with the bypass air flowing between the fan blades providing cooling for the compressed air directed to the combustion chamber.

This continuation-in-part application includes additional configurations of turbojet engines of the type described in my patent application Ser. No. 10/292,829 filed on Nov. 12, 2002. The subject embodiments of the turbojet engine in this disclosure are designed for high altitude commercial and military aircraft in both atmospheric and space flight. The common feature of the two embodiments of the high altitude turbojet engines is the use of rocket propulsion with atmospheric oxygen in atmospheric flight and enriched liquid oxygen at high altitude and space flight. These hybrid systems provide a universal propulsion system for a variety of military and commercial applications with a tremendous reduction in the costs of operation.

The greatest barriers for high performance gas turbines and jet engines are the limitations on maximum temperature acceptable for combustion gases and the limitations in the pressure ratio of air compression in the engine cycle. The metallurgical properties of gas turbine blades and the limited cooling schemes available for gas turbine blades combine to severely limit turbine inlet temperatures. In turn this requires a high air-fuel ratio of 50/1 to 60/1 to maintain inlet temperatures within the range acceptable for modern turbine blade designs. The embodiments of the turbojet engines having rocket capabilities solves these problems and produce the maximum absolute thermodynamic performance for aircraft in atmospheric and space flight.

SUMMARY OF THE INVENTION

This invention relates to turbojet engines and integrates all the functions of conventional turbojet modules into one single, ducted, combination bypass fan, provided with common fan blades having internal centrifugal compressor cells, connected with peripheral turbine blades and surrounded by an annular combustion chamber. The propulsion is the result of the bypass air flow that flows between the blades and is combined in a common jet flow with the circulated combusted gases from the annular combustion chamber.

This integration of modules results in a massive reduction in complexity, weight, cost and overall dimensions of the propulsion unit. This reduction is associated with a maximization of the absolute thermal energetic capacity and thermal efficiency by the ability to work at the stoichiometric level. This ability is the result of internally cooling the turbine blades by cool isothermically compressed air that is centrifugally compressed within the hollow fan blades and is cooled by intake air flowing between the fan blades, and in certain embodiments by fuel injected inside of the turbine blades.

In one embodiment an axial electric compressor and an associated centrifugal electric fan-turbine are in permanent energetic connection to conserve the constant compression-combustion pressure at all regimes, which enables a constant maximum thermal efficiency to be generated.

In certain embodiments the primary turbine engine of this invention is combined with a conventional turbojet that functions as a starter or booster.

In other embodiments the rotary parts of the engine do not come in contact with combustion gases thereby providing a cold turbine engine.

In one embodiment the turbine engine is configured for use as a marine propulsion system that can be externally attached to a naval vessel for primary or supplemental propulsion with an air jet injected into the water for forward propulsion.

The additional embodiments included in this continuation-in-part application are designed to permit the turbojet engine of the type disclosed to be used in high altitude and space flight.

Although commercial applications for high altitude or space flight have been proposed, the ultra high cost of using liquid oxygen in rocket systems has rendered rocket flight unacceptable for commercial applications. Traditionally rocket systems utilized liquid oxygen even during atmospheric flight where there is an abundance of oxygen available without limitation. Practical commercial plans for space flight are typically less dramatic and imagined. For example, plans for high speed cargo transport contemplates only a brief period in the ionosphere with the majority of the flight occurring in the atmosphere or high atmosphere where oxygen is available.

The common denominator of both solutions proposed is a capacity to use rocket propulsion with atmospheric oxygen in the atmospheric flight, and a conversion for enriched liquid oxygen only in the high altitude or space flight, making them universal propulsion systems for all kind of applications. For the first time propulsion is available for commercial aviation.

A second common feature of both embodiments is an ultra high air pressure ration 100–200/1 that is achievable with substantially isothermal compression in the engine cycle when the engine of each embodiment is using atmospheric air for combustion, resulting in a maximum absolute thermodynamic efficient of about 80 percent.

A third common feature is the ability to utilize a combustion capacity at the stoichiometric level resulting in a system having a maximum absolute thermodynamic power propulsion. These and other features will become apparent from the detailed description of the preferred embodiments that follows:

The general applicability of our invention is described in the examples of air vehicles included in this invention.

BRIEF DESCRIPTION OF THE DRAWINGS

FIG. 15A is a schematic view of a general aviation conversion to VTOL capacity.

FIG. 15B is a schematic view of the conversion of FIG. 15A converted to VTOL capacity.

FIG. 18A is a schematic top view of a universal mobility aircraft with attached propulsion modules to the wings.

FIG. 18B is a schematic end view of the universal mobility aircraft of FIG. 18A.

DETAILED DESCRIPTION OF THE PREFERRED EMBODIMENTS

The turbojet engine 10 of this invention is described in multiple embodiments with reference to the drawings. It is to be understood that the schematic illustrations on the drawings typically show engine configurations in cross sectional view of one half of the axially symmetric engine, and references to fan blades, turbine blades and compressor blades are illustrated and frequently referenced by a single blade or portion of a blade having multiple functions.

Figure 1A:
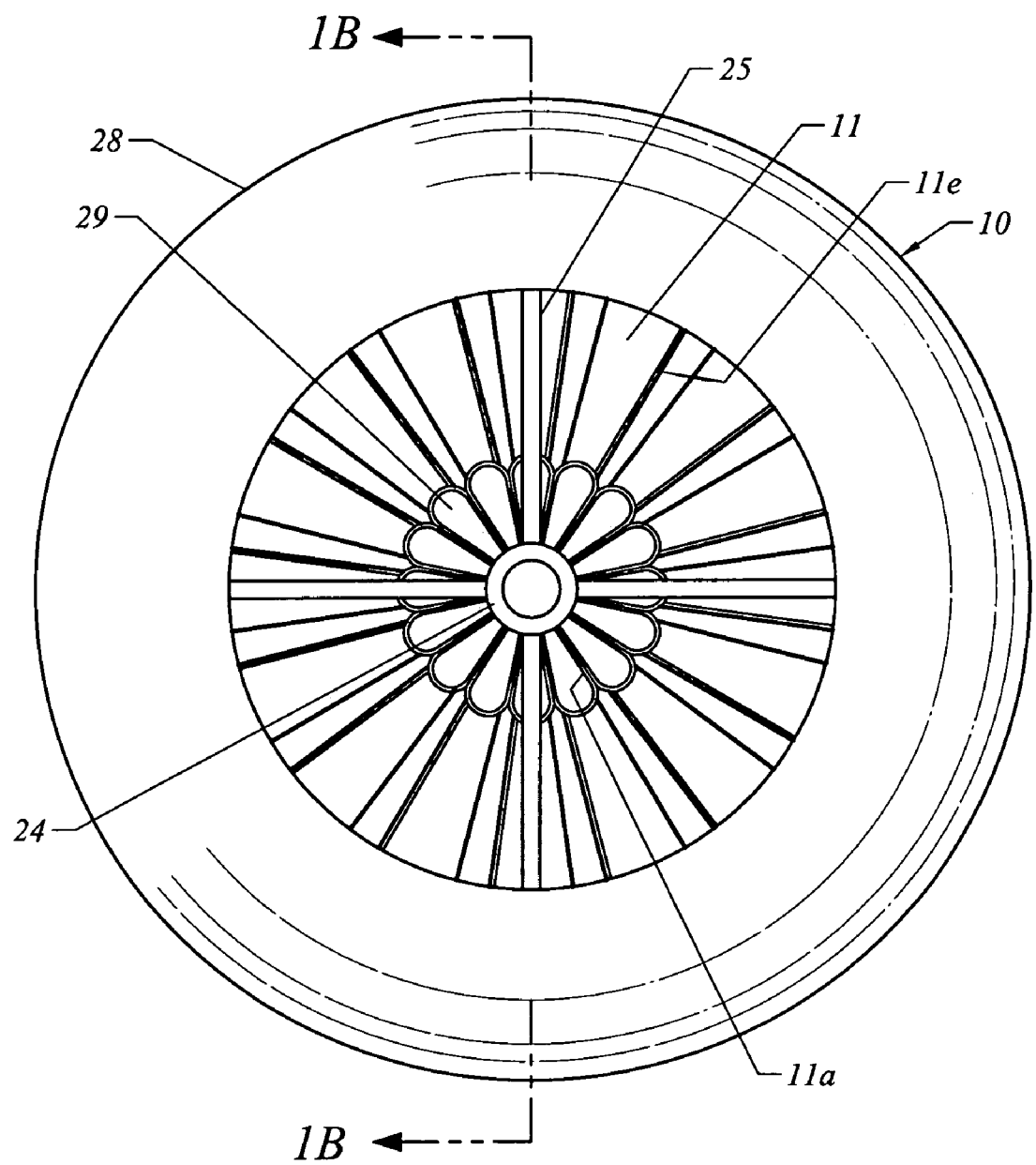
FIG. 1A is a schematic illustration of the front elevational view of the basic integrated by-pass centrifugal turbojet engine with features generally characteristic of multiple embodiments of this invention.
Figure 1B:
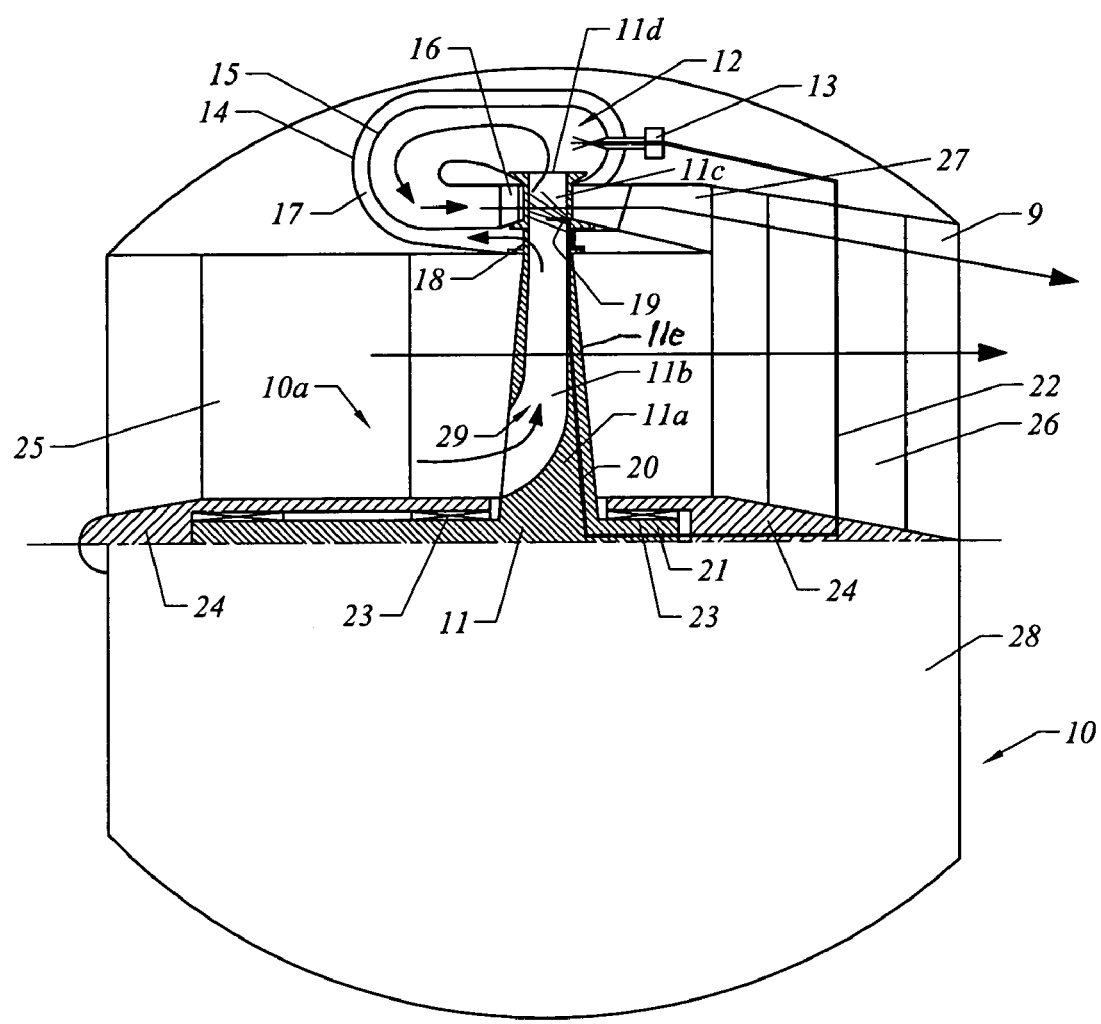
FIG. 1B is a schematic illustration, partially in cross-section, taken on the lines 1B—1B in FIG. 1A.

In FIGS. 1A and 1B, a basic embodiment of the turbojet engine 10 is shown with FIG. 1A being a typical end view and FIG. 1B being a schematic partial cross-sectional view.

In FIGS. 1A and 1B, there is depicted an integrated by-pass centrifugal turbojet engine, indicated by the numeral 10, in which is located a rotor disk unit 11 comprising a combined one-piece fan unit 10.a, including as unitary parts, a fan 11.a with fanblades 11e, centrifugal compressor cells 11.b and, turbine blades 11.c. The rotor disk unit 11 is combined with a peripheral combustion chamber 12, provided with a fuel injector 13, an external housing 14, a perforated internal housing 15, nozzles 16, and an air plenum 17, connected through the centrifugal cell 11.b by the side aperture 18.

The internal walls of the turbine blades 11.c are cooled by fuel injection into an internal passage 11.d by injector 19, and by the centrifuged and compressed air through cells 11.b.

The air is admitted into the fan blades 11.e through openings 29 and is centrifuged and compressed in the air cells 11.b and cooled by contact with the walls of the rotor disk unit 11.

The fuel is supplied initially from injectors 13 and from internal fuel channels 20 coming from the central shaft 21 and fuel connections 22.

The combined rotor disk unit 11 is supported by bearings 23 connected with a central body 24 supported by internal struts 25, 26 and 27 that are connected with the housing structure 28 in the form of a turbojet pod.

The air is admitted into the fan blades 11.d through openings 29 and is centrifuged and compressed in the air cells 11.b and cooled by contact with the walls of the rotor disk unit 11.

The main axial air flow through the rotor disk unit 11 between the fan blades 11.e intensively cools the radially centrifuged air of the compression process to the isothermic level, consuming minimum energy. The compressed air is conducted to the combustion chamber 12, in part through the aperture 18 to the perforated air plenum 17 and in part radially from the internal body of the turbine blades 11.c, where it is mixed with the fuel injected into passages 11.d of the turbine blades 11.c.

The rich mixture of compressed air and vaporizing cooling fuel in the turbine blades 11.c is expelled from the tip of the blades directly into the combustion chamber 12, and after combustion the combustion gases are ejected at high velocity through the nozzle 16 to drive the turbine blades 11.c and the fan, and finally from a peripheral propulsion jet nozzle 8 to join the main air jet through the bypass part of the fan 11.a for mixing in the common ejection nozzle 9.

The new turbojet of this invention is the most simple, efficient, powerful and lowest cost engine yet devised for aviation.

Figure 2:
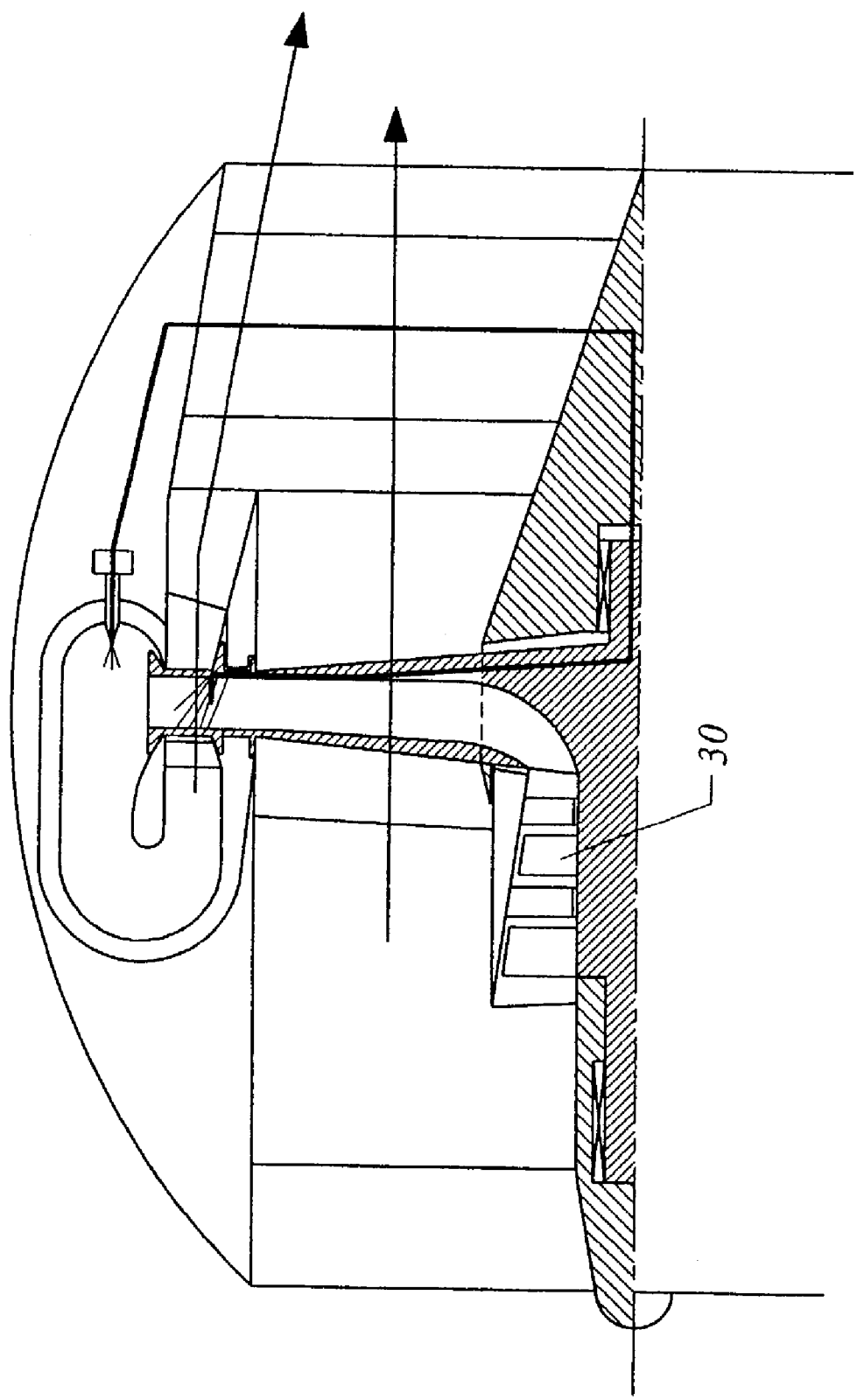
FIG. 2 is a schematic view of an integrated by-pass axial-centrifugal turbojet.

In FIG. 2 there is depicted the same integrated by-pass turbojet engine 10 with the addition of an axial compressor 30. All the other components are the same as those of FIG. 1 with similar functions.

Figure 3:
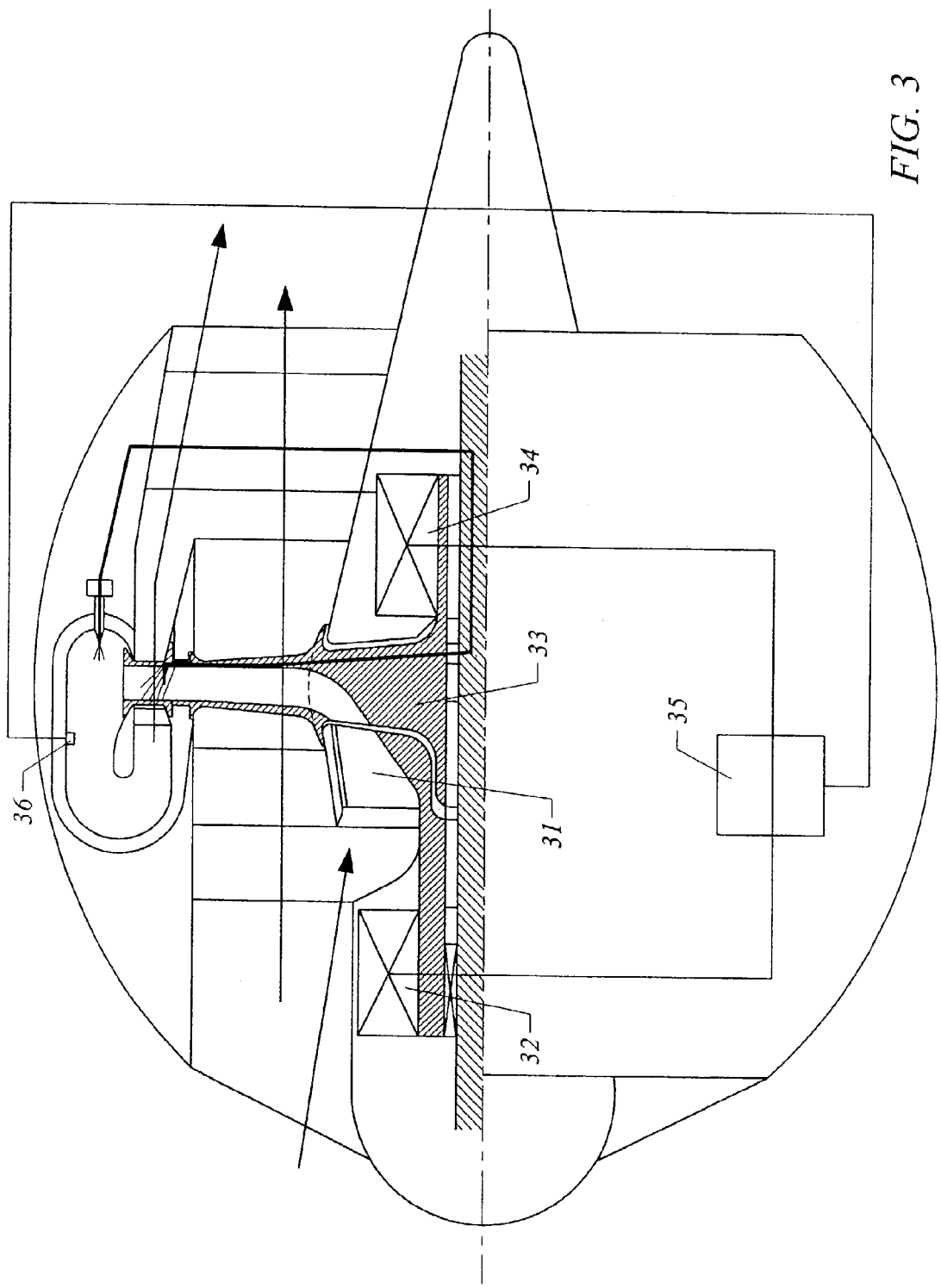
FIG. 3 is a schematic view of an integrated by-pass axial electro-centrifugal turbojet.

In FIG. 3, the special configuration is the result of the introduction of a new axial compressor 31 driven by an electric motor 32. The combination one-piece fan unit 10.a with a rotating fan 11a and the combination, centrifugal compressor and turbine 33 is constructed similar to the rotor disk unit 11 described above and drives the electric generator 34. The electric generator 34 is electrically connected to a controller box 35 and to an electric motor 32 for powering the motor 32 and driving the counter rotating axial compressor 31.

The pressure sensor 36 indicates in real time the pressure in the combustion chamber. If this pressure drops at lower speeds of the fan-compressor-turbine 33, the box 35 commands the acceleration of the speed of the axial compressor 31 to restore the pressure to its efficient constant level. If the pressure rises over the prescribed level, the same box 35 commands the reduction of the speed of the axial compressor 31.

The final result will be a conservation of the maximum thermal efficiency at all loads and regimes.

Figure 4:
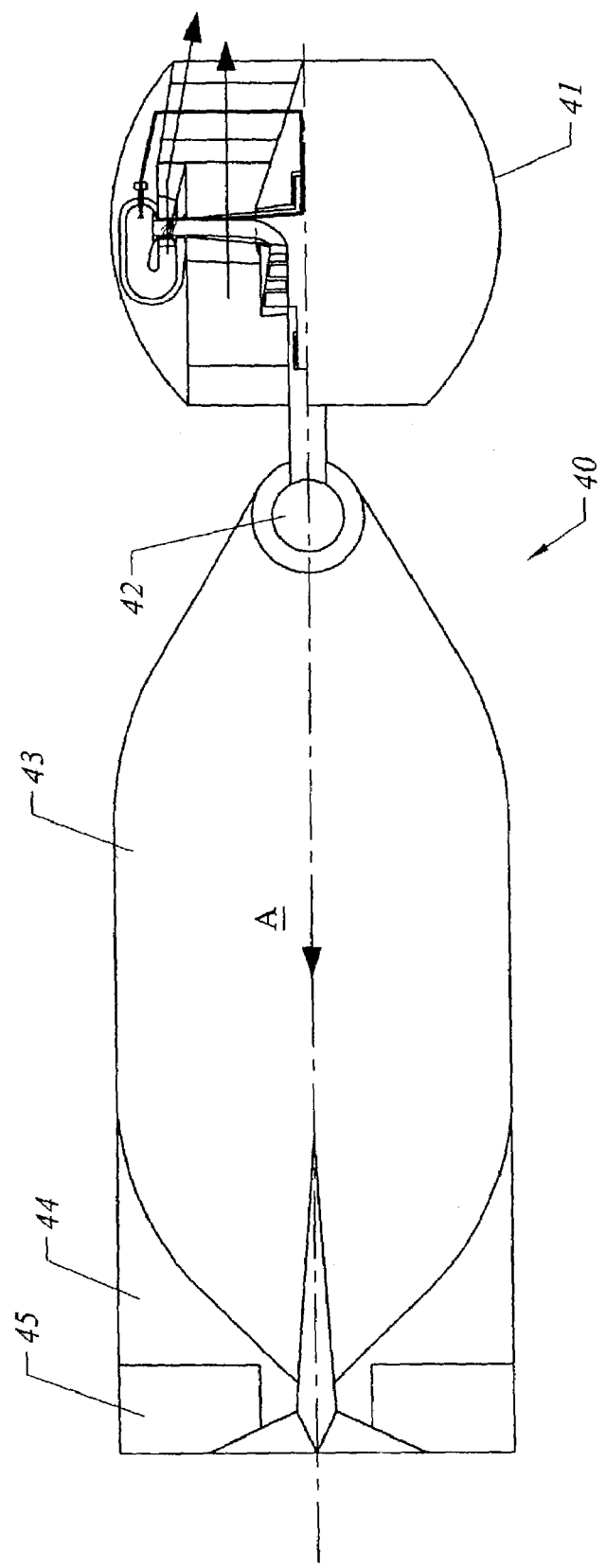
FIG. 4 is a schematic view of a total mobility-push-turbojet cruise missile.

In FIG. 4 there is depicted a first application of the by-pass turbojet engine 10 having the combination one-piece fan unit 10.a for driving a cruise missile 40 by attaching the turbojet engine 10 as a turbojet 41 in a "push A" mode of action by the articulated spherical gimbal connection 42 to the body 43 of the cruise missile 40. The cruise missile 40 is provided with a cruciform 44 with rudders 45. Angular articulation and deviation of the turbojet 41, combined with the cruciform rudders 45, produces a total mobility capability with instant performance in all directions. This type of aircraft may be initially propelled from tubular launchers.

Figure 5:
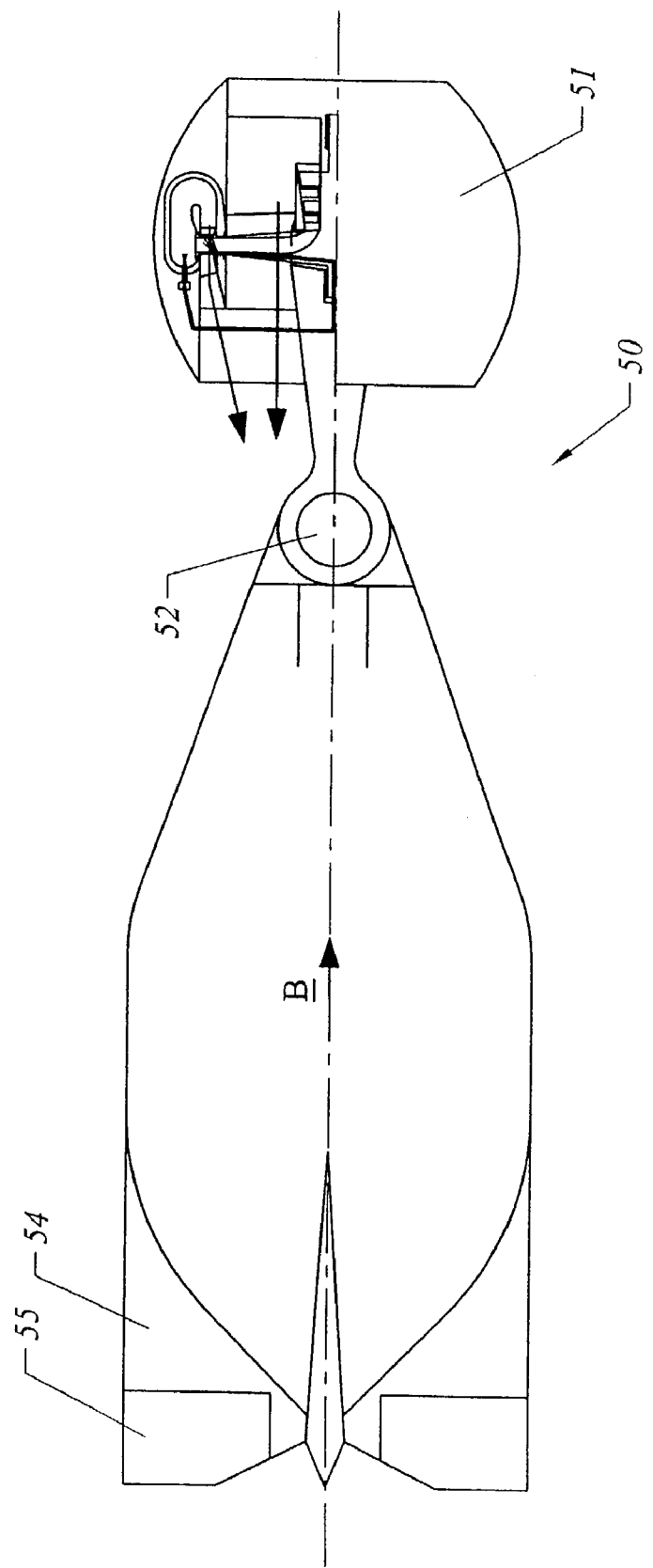
FIG. 5 is a schematic view of a total mobility-pull-turbojet cruise missile.

In FIG. 5 there is depicted a second application for driving a cruise missile 50 by attaching the turbojet engine 10 as a turbojet 51 in a "pull B" mode of action by an articulated spherical gimbal 52 to the body 53 of the cruise missile provided with a cruciform tail 54 with the rudders 55 to produce a total mobility capability. This type of embodiment is started and launched from any platform.

Figure 6:
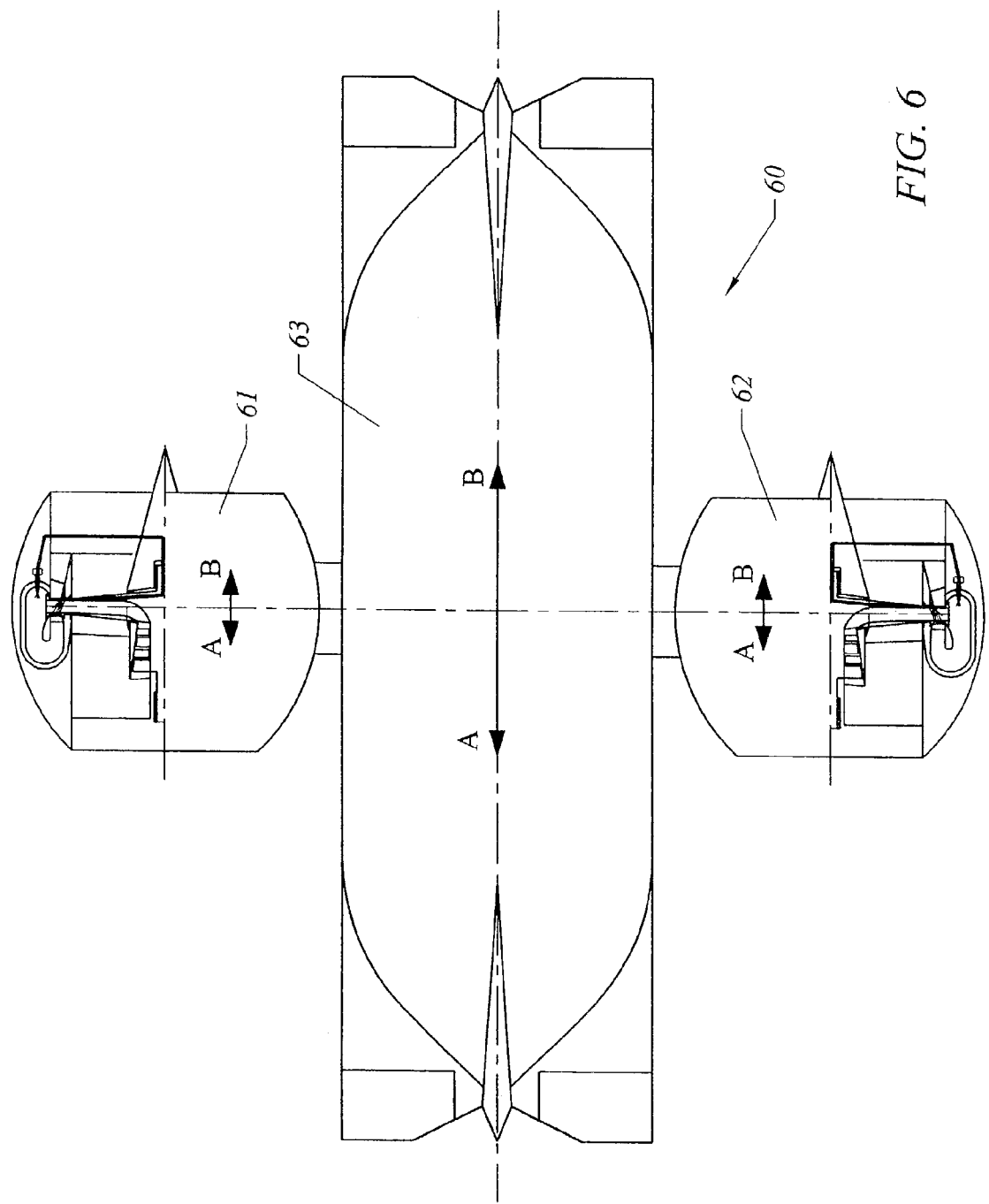
FIG. 6 is a schematic view of a total mobility double-turbojet.

In FIG. 6 there is depicted a third and universal mobility aircraft application in which the turbojet engines 10 as two turbo jets 61 and 62 that are rotatably articulated on both sides of the vehicle 63, produce movement of the vehicle 63 in all directions, A and B, including vertical, horizontal and, rotational and unlimited combinations of all of them. This is the maxim absolute mobility air vehicle.

Figure 7:
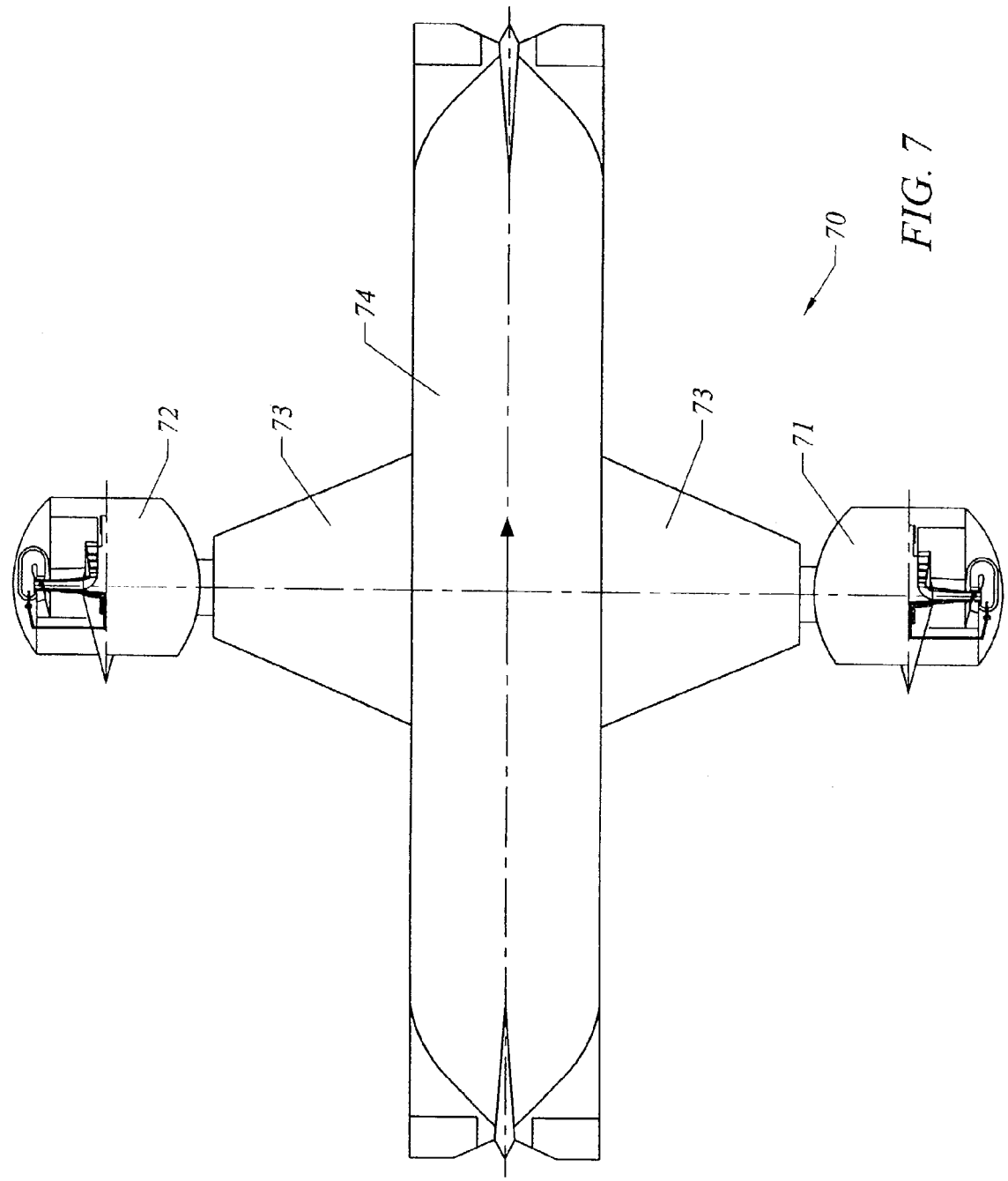
FIG. 7 is a schematic view of a total mobility-wing-turbojet.

In FIG. 7 there is depicted the fourth application of the turbojet engine 10 as turbojets 71 and 72 gimbal connected to a body 74 for air vehicles 70 provided with wings 73. The air vehicle 70 is also capable of performing the total universal mobility capability, which is the most important revolution in modern aviation.

Figure 8:
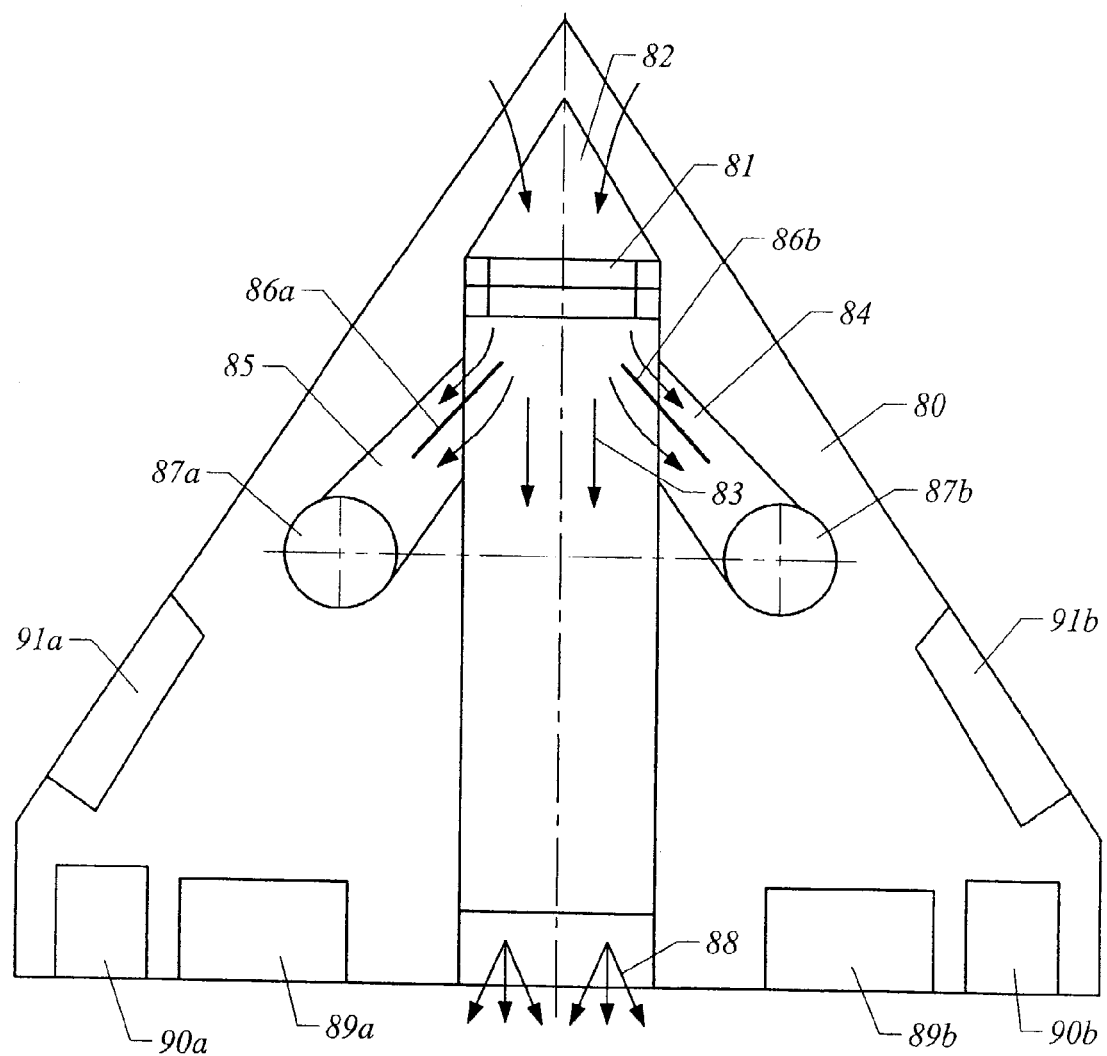
FIG. 8 is a schematic view of a total mobility-VTOL-wing-turbojet.

In FIG. 8 there is depicted a fifth application of the turbojet engine 10 for a VTOL wing vehicle 80 in which the integrated turbo by-pass jet 81, described in the first embodiment of the invention, is located in the front of the VTOL wing vehicle 80. The VTOL (vertical takeoff or landing) wing vehicle 80 has an intake channel 82, completely masked in the front profile of the fuselage for radar avoidance. Air-gas propulsion is diverted from a central channel 83 to a right channel 84 and a left channel 85 by the variable deflectors ports 86a and 86b. Transverse perpendicular openings 87a and 87b direct the selectively diverted airgas flow to each side of the wings for up or down discharge relative to the surface of the wing. The variably directed central exit 88 at the aircraft tail directs the main flow of air-gas and vector of jet propulsion axially in the main direction, or perpendicular to the face of the wing in either direction, up or down. The auxiliary wing panels 89a, 89b, 90a, 90b, 91a and 91b provide general control surfaces for controlling the flight of the vehicle. The combination of the actions of the openings 87a, 87b and the variably directed central tail 88 enable the vertical take-off from any position and toward any direction making the vehicle a universal mobility VTOL wing and an absolute revolution of aviation. For naval applications, the vertical position of the vehicle standing on its tail can permit an aircraft carrier to carry the maximum number of VTOL wings, which can take-off simultaneously, maximizing the offensive capability.

Conventional winged aircraft are stored on horizontal runways and platforms and can take off only sequentially, limiting the offensive capability.

Figure 9:
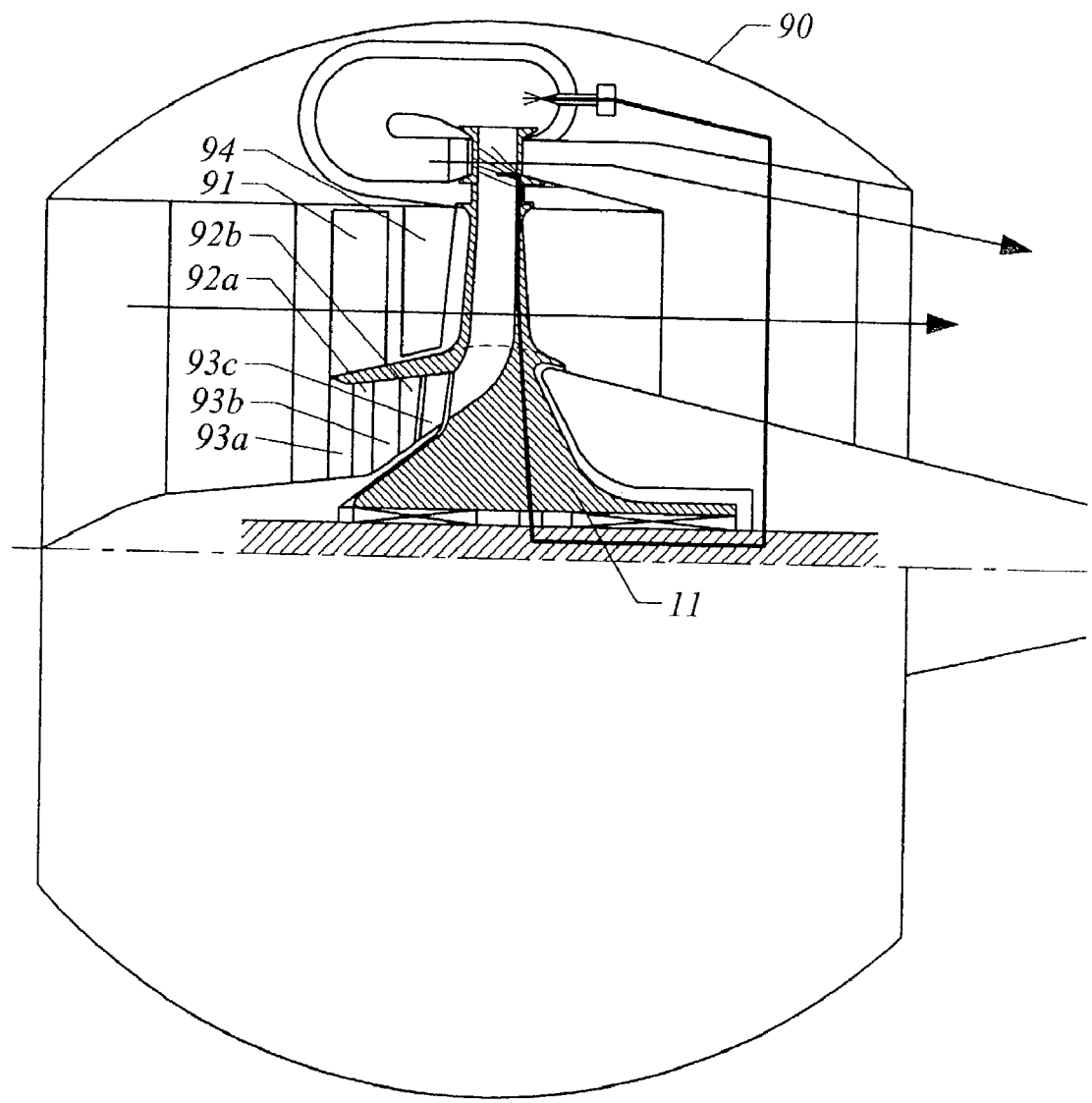
FIG. 9 is a schematic view of a two stage turbofan.

In FIG. 9 there is depicted the turbojet engine 10 in the embodiment of a two stage turbofan pod, indicated generally by the numeral 90, wherein the single moving component of the integrated fan-centrifugal compressor-gas turbine is the rotor unit 11, having an additional front fan 91, with connected axial compressor blades 92a, 92b and 92c separated by axial compressor fixed blades 93a, 93b and 93c. The fixed fan blades 94 comprise the stator blades of the bypass turbofan. The other internal components are identified and described with reference to FIG. 1.

Figure 10:
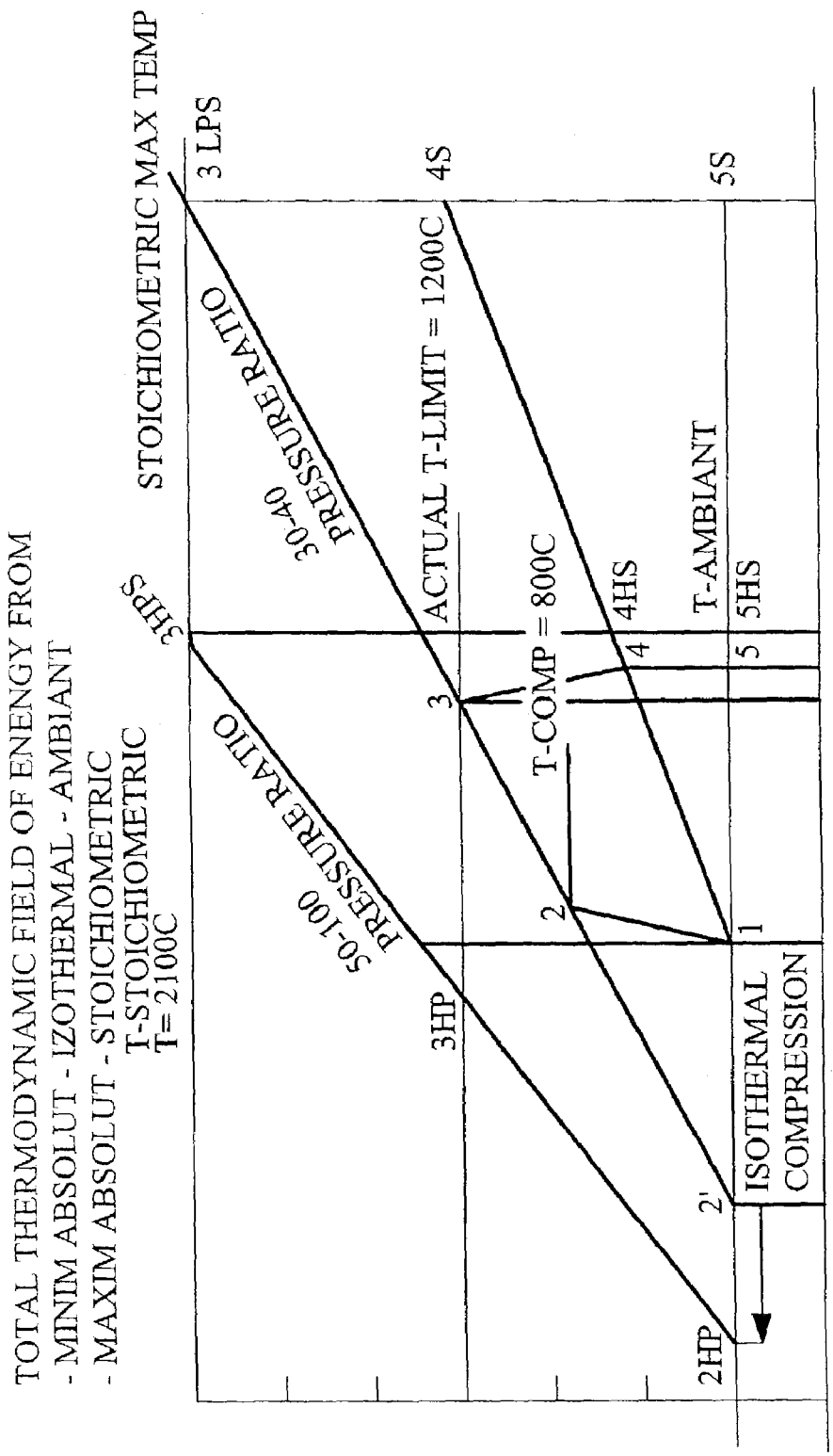
FIG. 10 is a T-S diagram for two levels of pressure ratios.

In FIG. 10 there is disclosed a comparative diagram depicting the thermal cycle of conventional gas turbines and the thermal cycle of the turbojet of this invention. The conventional thermal cycle of actual modern gas turbines with limited pressure ratios 30–40 and polytropic compression, (1–2), with the turbine inlet temperature (3), limited by structural conditions is indicated in the diagram T-S by the cycle points:

1-2-3-4-5-1

The useful power of the cycle is represented by the cycle points:

1-2-3-4-1

When the same cycle is extended to the stoichiometric maximum temperature (3LPS) added turbine power is achievable and is indicated by the cycle points:

1-2-3LPS-4S-5S-1

When the same cycle is extended by isothermal compression (1–2), the maximum power of the turbine at stoichiometric level minus–minimum isothermal compression power equals the maximum effective power of a cycle, having the limited pressure ratio of 30–40.

For the higher pressure cycle of the turbojet of this invention with pressure ratios of 50–100, and isothermal compression, (1–2 HP), and with a maximum stoichiometric temperature (3HPS), the maximum absolute thermal cycle is indicated by the cycle diagram points:

1-2HP-3HP-3HPS-4AS-5AS-1

At part load, the cycle will be limited as indicated by cycle points:

1-2HP-3HP-1

For this limited part load cycle the thermal efficiency is virtually 100% because all the cycle is produced with negative entropy values.

Figure 11:
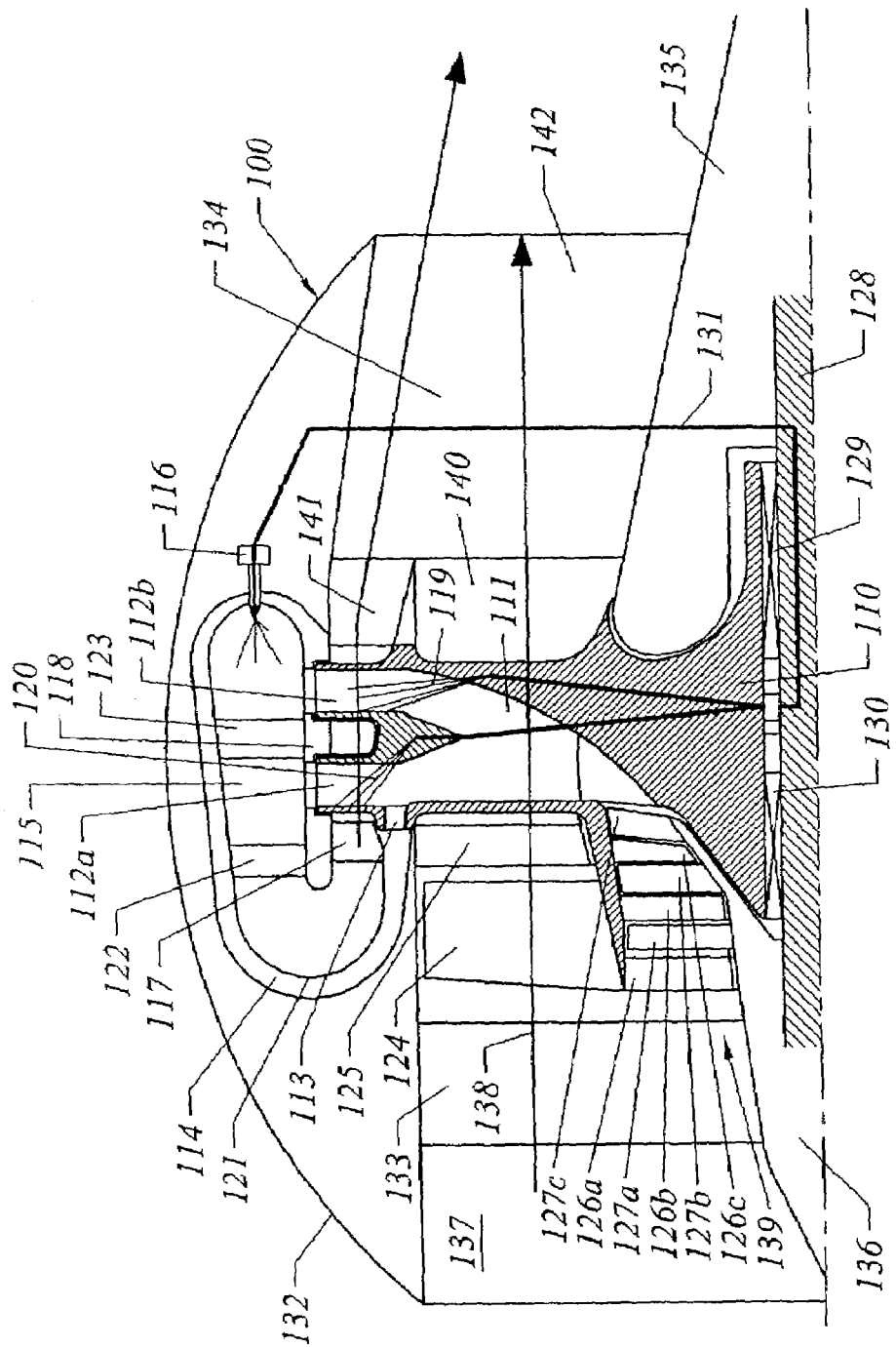
FIG. 11 is a schematic view of a two stage turbine cycle.

In FIG. 11 there is depicted the turbojet engine 10 having a two stage turbine cycle. The turbojet engine 10 is in a turbojet pod indicated generally by the numeral 100, and includes a double fan-compressor-turbine rotor unit 110, having an internal centrifugal channel 111 penetrating the dual hollow turbine blades 112a and 112b and diverting a part of the compressed air through the by-pass apertures 113 to the air plenum 114 surrounding the reverse flow combustion chamber 115. The combustion chamber 115 is provided with one or more fuel injectors 116 and the nozzle vanes 117 and 118 separating the two stages of the turbine.

The rotor unit 110 is provided with additional fuel injectors 119 and 120 injecting fuel inside of the hollow turbine blades 112a and 112b. The plenum around the combustion chamber is provided with a perforated internal combustion chamber wall 121 with internal pylons 122 and 123.

The rotor unit 110 is provided with first stage fan blades 124, that coact with stator fan blades 125. The rotor unit 110 also is provided with axial compressor rotor blades 126a, 126b and 126c that coact with static axial compressor blades 127a, 127b and 127c. The rotor unit 110 is centered on a fixed shaft 128 and is supported by bearings 129 and 130. Fuel is supplied to the hollow turbine blades 112a and 112b through the fuel line 131.

The aerodynamic body of the turbojet 100 pod is formed from the outer housing 132 with front pylons 133 and back pylons 134 connecting a back tail 135 and front cone 136 encasing the fixed shaft 128.

The axial and centrifugal air compression dissipates the heat of compression through a heat exchanging effect with the first stage fan blades 124, and by the fan section 110a of the rotor unit 110.

The heat extracted from the isothermal compression is transferred to the by-pass air and heats the propulsion air by a regeneration effect. The internal cooling energy of the turbine blades 112a and 112b is returned in the cycle by the regenerative effect of the pre-heated air and fuel expelled in the combustion chamber 115.

Air from the ram intake 137 is divided into two flow paths, a bypass path 138 and a compressed air path 139. With a unique, high bypass ratio of 12–20, air in the by-pass path passes through the fan nozzle 140 and is mixed with the expanding combustion gases discharged through the combustion exhaust nozzle 141. The mixed flows form the total propulsion medium in the combined exhaust jet nozzle 142. The final result is the most efficient turbo fan-jet yet developed with ultra-low, infra-red signature.

Figure 12:
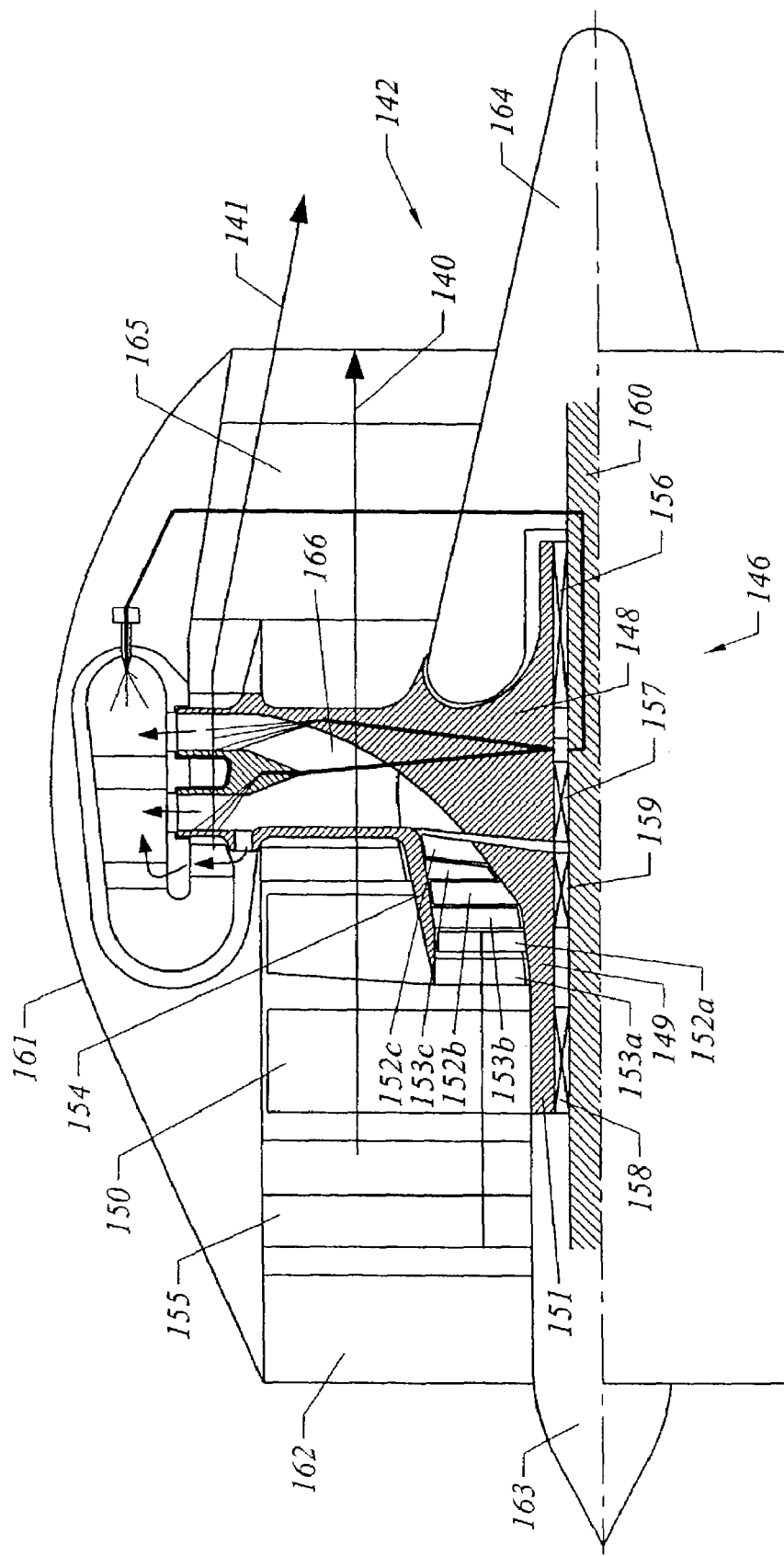
FIG. 12 is a schematic view of a two stage turbine cycle with counter rotating compressor driven by a front air free turbine.

In FIG. 12 there is depicted the turbojet engine 10 having a two-stage turbine cycle with counter rotating compression provided by an added front, free wheeling, air turbine. The dual rotor turbojet pod is designated generally by the reference number 146. The main, two-stage combination fan and turbine rotor unit 148 is associated with a counter-rotating front, free wheeling, air turbine rotor unit 149. The free wheeling air turbine rotor unit 149 has turbine blades 150 that drive the rotor unit 149 and the axial compressor blades 152a, 152b, and 152c carried on an extended hub 151 of the rotor unit 149.

The two-stage, fan and turbine rotor unit 148 has axial compressor blades 153a, 153b, and 153c carried on an extended shroud 154, that are driven counter to the axial compressor blades 152a, 152b, and 152c of the free-wheeling air turbine rotor unit 149. Depending on the flight speed, the effect of the dynamic ram air can be transformed into a dynamic whirl effect, as controlled by the angular geometry of the variable guide vanes 155. The generated air coacts with the turbine blades 150 and drives the counter-rotating, free-wheeling air turbine rotor unit 149.

The variable speed of the counter rotating axial compressor 167 formed by the combined components of the two rotor units 148 and 149 produces an initial compression of air prior to entry into the radial or centrifugal compressor 166 of the combination fan and turbine rotor unit 148. This preliminary compression provides the capability to conserve a final combined constant pressure ratio at any practical flight speed.

The combination fan and turbine rotor unit 148 rotates on a fixed shaft 160 on bearings 156 and 157. In a similar manner, the free-wheeling air turbine rotor unit 149 rotates on the fixed shaft 160 on bearings 158 and 159, but rotates counter to the rotation of the combination fan and turbine rotor unit 148. The dual rotor turbojet pod 146 has an outer housing 161 with pylons 162 supporting a front cone 163 and pylons 165 supporting an aft tail 164. Other components are identical to the identified in the embodiment of FIG. 11.

Figure 13:
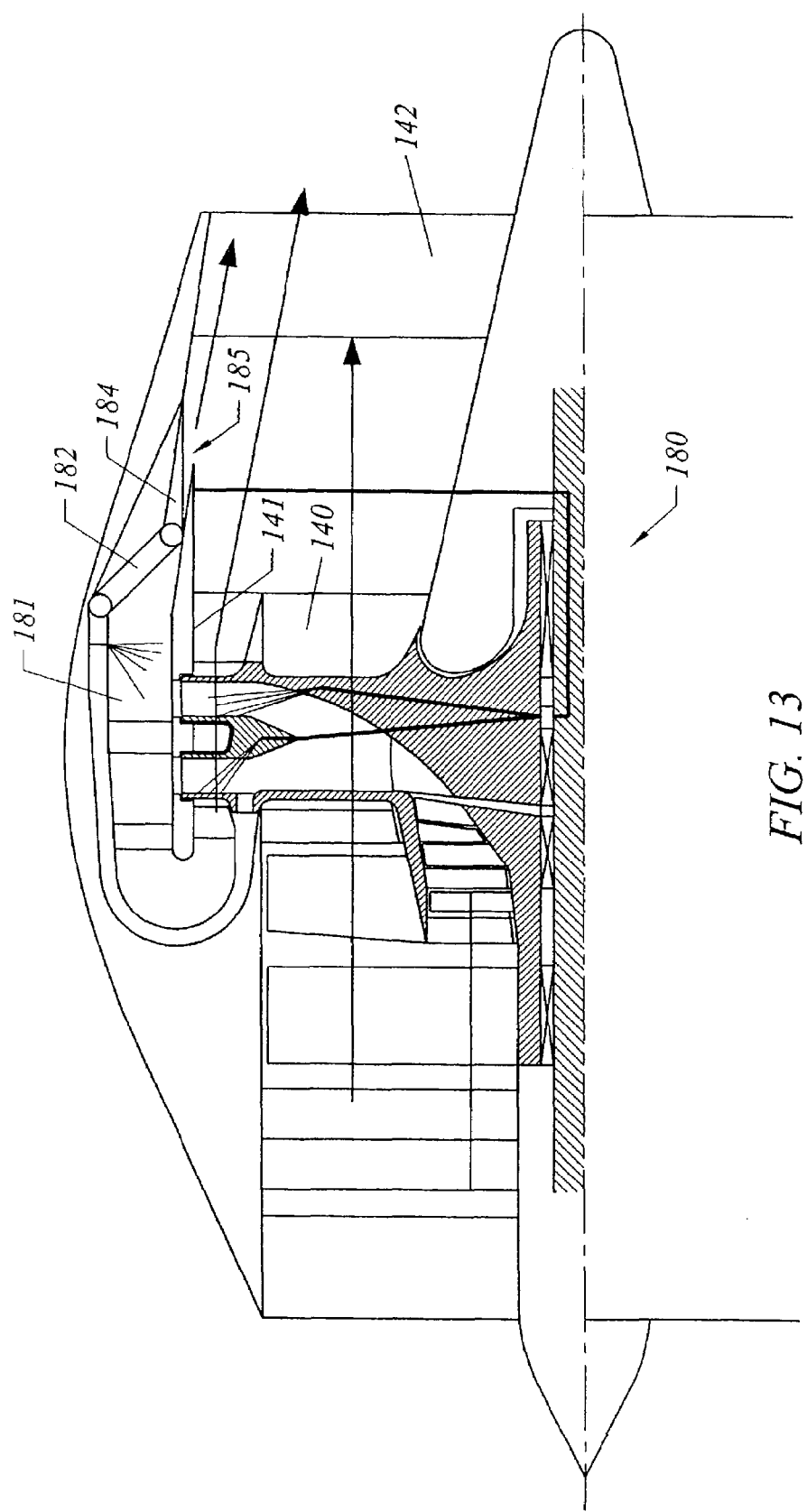
FIG. 13 is a schematic view of a double by-pass turbofan with convertible cycle.

In FIG. 13 there is depicted the turbojet engine 10 having the general configuration of the turbojet pod 146 of FIG. 12 with a modified combustion chamber to provide a double by-pass turbofan with a convertible cycle. The convertible turbojet pod 180 of FIG. 13 has a combustion chamber 181 with an articulated, variable geometry bypass mechanism 182 that converts the combustion chamber 181 from one having a single annular discharge 141 to one including a second bypass discharge 183. The variable geometry bypass mechanism 182 has nozzle lens members 184 to control the size of the discharge nozzle 185 according to operating conditions.

At higher velocities of the air vehicle the dynamic ram compression is significant. The ram effect raises the compression ratio for the compressor stages to maintain the desired compression ratio. In turn this reduces the power requirement of the turbine stage. The variable geometry bypass mechanism 182 directly discharges a portion of the combustion chamber gases through a variable discharge nozzle 185 directly into the air from the fan nozzle 140 and the working turbine gases from the primary combustion exhaust nozzle 141.

Figure 14:
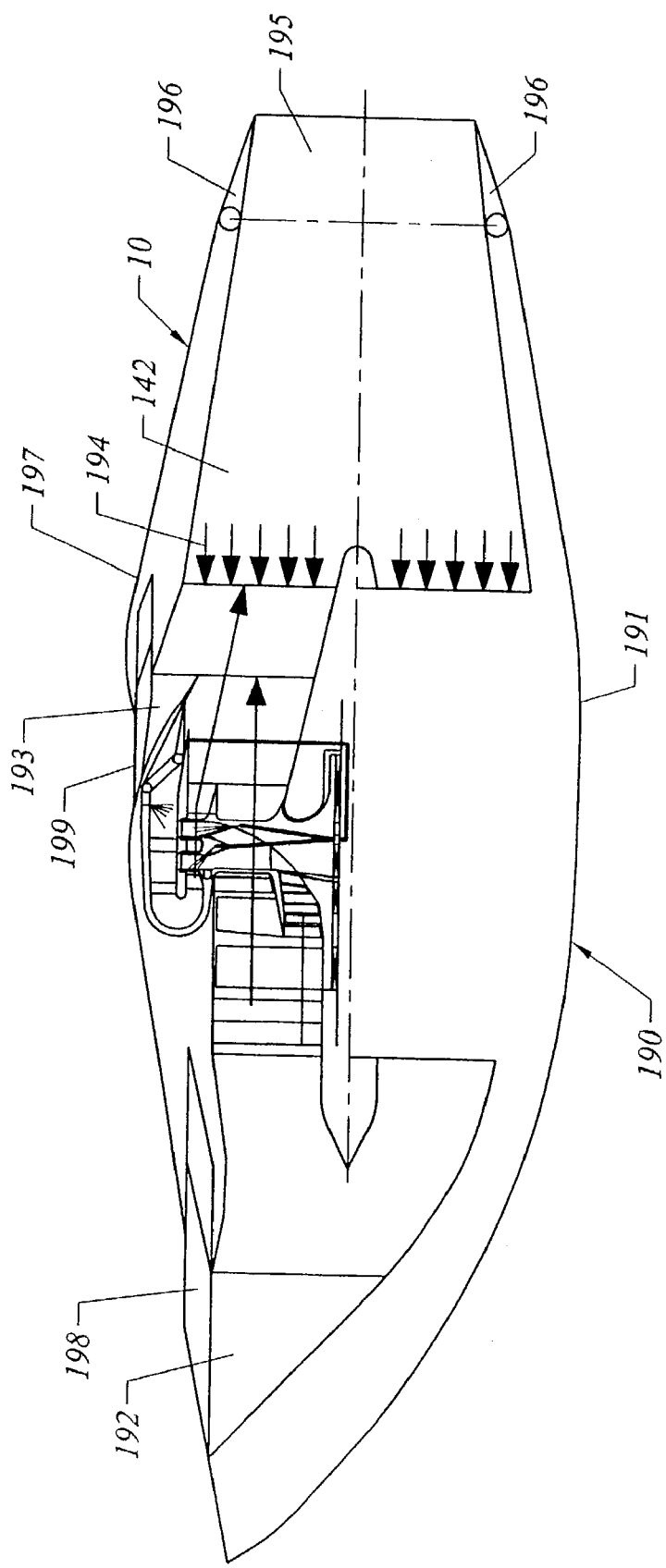
FIG. 14 is a schematic view of a triple by-pass turbofan with convertible cycle, subsonic to supersonic.

In FIG. 14 there is depicted a turbojet engine 10 in the embodiment of a triple bypass turbofan pod 190 with a convertible cycle suitable for subsonic and super sonic vehicle speeds. The turbofan pod 190 has a structure that integrates a turbofan as described with reference to FIG. 13 into a variable geometry intake and exhaust housing 197. The intake and exhaust housing 197 has a front variable geometry intake 192 with slide baffle 198, a bypass intake 193 with a slide baffle 199 and a variable geometry exhaust nozzle 195 with lens flaps 196. Within the combined exhaust jet 142 is an afterburner 194.

With full open front intake 192 and retracted slide baffle 198 at subsonic flight, the air intake is adjusted appropriately to preserve the optimum condition for turbofan operation as the vehicle approaches transonic and supersonic speeds. At higher supersonic speed the air bypass intake 193 is gradually opened and the afterburner 194 fired for converting the cycle to combined turbo ram jet operation. To minimize detection by radar, the air intakes 192 and 193 are located on the top of the turbofan pod 190.

In FIGS. 15A and 15B there is depicted a general aviation vehicle converted to VTOL capability, indicated by the generic number 200. The general aviation vehicle 200 combines a generic aircraft 201 with propulsion modules 202a and 203b of the type described with reference to the previous figures of this specification. The propulsion modules 202a and 202b are oriented for down vertical propulsion jets, producing the lift for the aircraft and a vertical take off.

The same aircraft 201a indicated, is provided with the same propulsion modules 202b and 203b in a horizontal orientation which produces a horizontal propulsion. Returning the modules 202a and 202b to the original vertical jet operation, the aircraft can land vertical. This super simple generic VTOL technology can produce a general revolution in aviation for conventional aircraft.

Figure 16A:
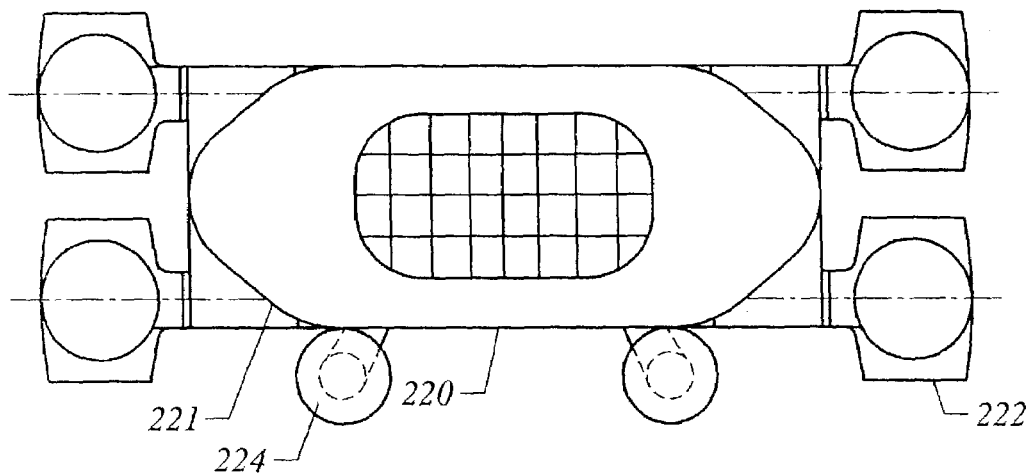
FIG. 16A is a schematic top view of a rectangular universal mobility platform.
Figure 16B:
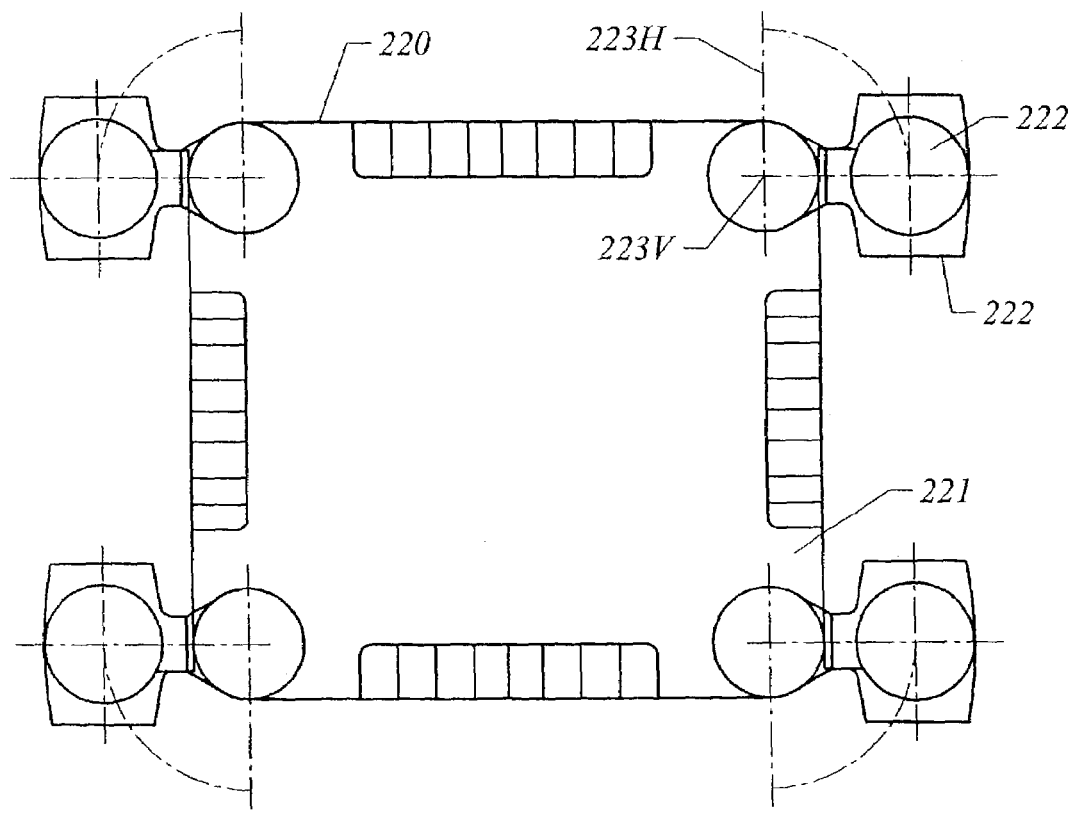
FIG. 16B is a schematic side view of the universal mobility platform of FIG. 16A.

In FIGS. 16A and 16B there is depicted a universal mobility platform vehicle, indicated by the generic number 220. The vehicle has a general platform for example, a rectangular four sided structure 221 which is provided with omni directional propulsion modules 222 and 224, described in this invention, articulated, for example, on each of the four corners of the platform structures 221 and 225. The omni directional propulsion modules 222 and 224 are able to rotate on the vertical axis 223V, and on horizontal axis 223H.

The combined general orientation of the propulsion modules 222 and 224 provides the vehicle 220 with a universal mobility capability in air flight including VTOL. On ground, the vehicles are provided with a hybrid propulsion system as described in our prior patents.

Figure 17B:
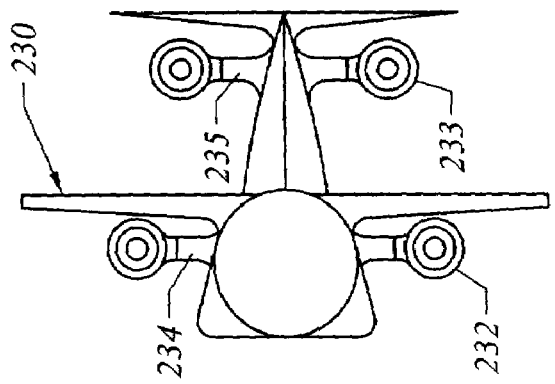
FIG. 17B is a schematic end view of the universal mobility aircraft of FIG. 17A.
Figure 17A:
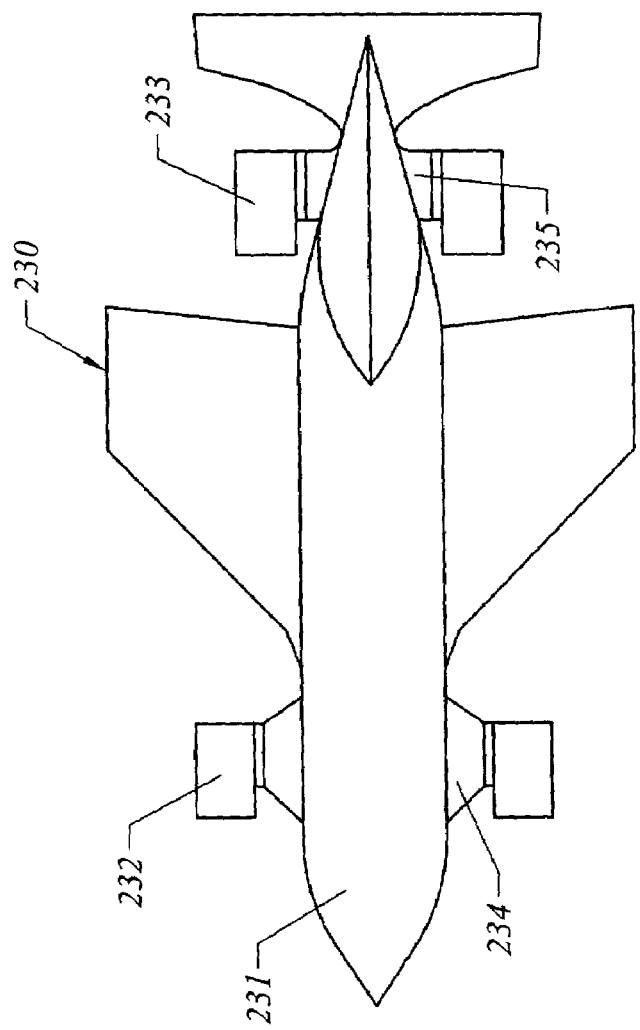
FIG. 17A is a schematic top view of a universal mobility aircraft with attached propulsion module to the body.

In FIGS. 17A and 17B there is depicted a universal mobility aircraft vehicle with a propulsion module attached to the body, indicated by the generic number 230. The combination aircraft vehicle 230 has a body 231 provided with omni directional propulsion modules 232 and 233, attached to pylons 234 and 235.

By vertical orientation of the omni directional propulsion modules 232 and 233, the aircraft vehicle 230 has VTOL capability and upon horizontal orientation performs like a conventional aircraft on horizontal flight.

In FIGS. 18A and 18B there is depicted a universal mobility aircraft vehicle with omni directional modules attached to the wing tips, indicated by the generic number 250. The combination aircraft vehicle 250 has a flying body 251 with wings 252. The omni directional propulsion modules 153 are attached to the wing tips 255.

On the tail's wings 254, omni directional modules 253 are also attached to the wing tips 256. The arrangement of the omni directional modules 253 creates a VTOL capability with the unique universal mobility characteristics.

Figure 19:
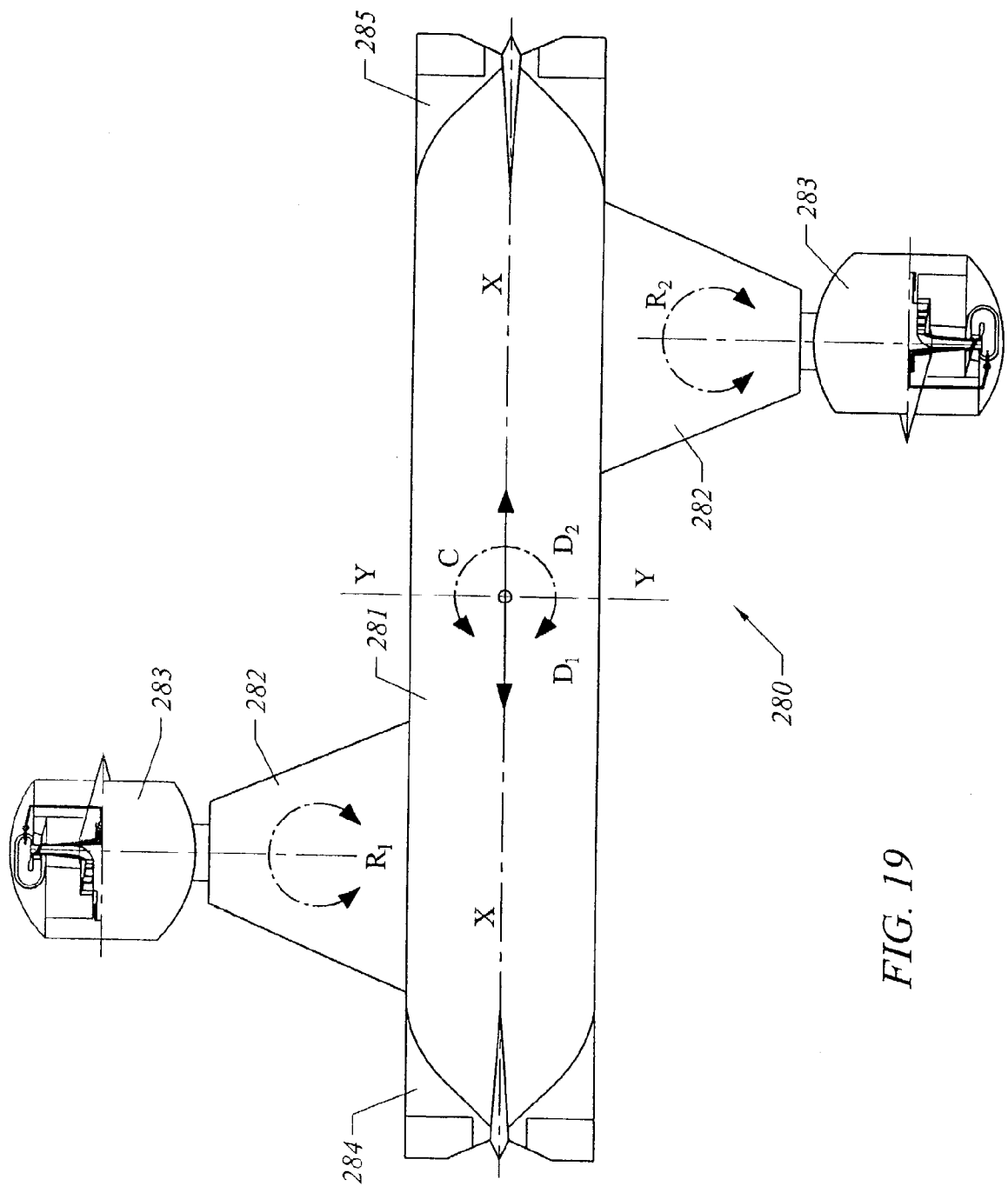
FIG. 19 is a schematic view of a omni-directional VTOL aircraft.

In FIG. 19 there is depicted an omni directional VTOL aircraft vehicle, indicated by the generic number 280. The combination aircraft vehicle has a flying body 281 provided with symmetrical wings 282 and attached omni directional modules 283, and symmetrical cruciform directional vanes 284.

By the total symmetrical configuration of the flying structure, the aircraft vehicle has the capability to be perfectly stable along the axis X—X, and Y—Y, to move, symmetrically on the directions D1, D2, and rotate around the vertical axis C.

Additional VTOL capabilities make this aircraft vehicle the most unique universal mobility aircraft in the history of aviation.

Figures 20A, 20B:
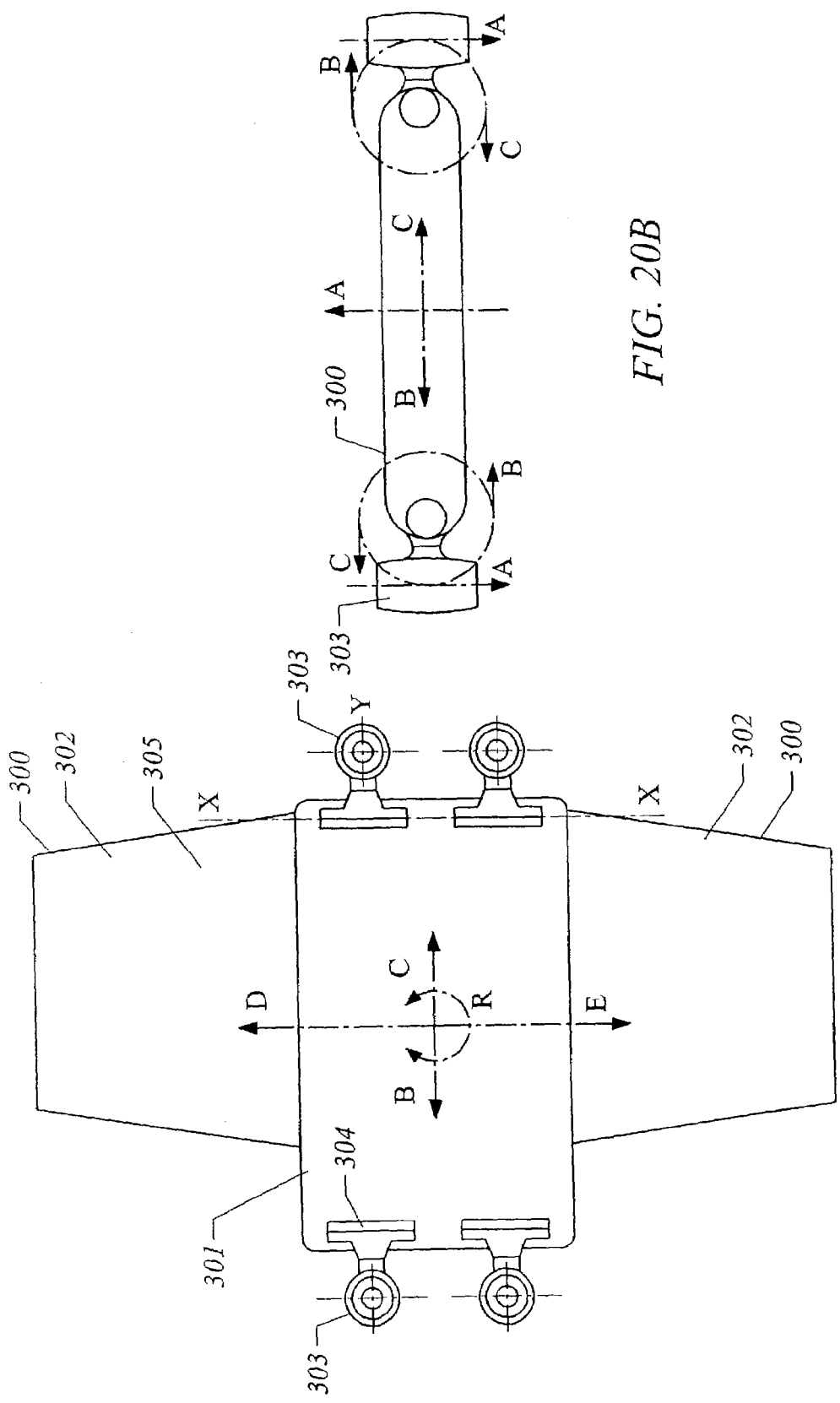
FIG. 20A is a schematic top view of a universal mobility long range vehicle with multiple vectorial jets.
FIG. 20B is a schematic side view of the universal mobility long range vehicle of FIG. 20A.

In FIG. 20 there is depicted a universal mobility long range aircraft vehicle with multiple vectorial jets, indicated by the generic number 300. The combination aircraft vehicle 300 has body 301 provided with blended wings 302 forming a flying omni directional wing 305. The flying wing 305 is fitted with omni directional propulsion modules 303 articulated on rotary arms 304 around the axis X—X, with the capability to take the arcuate position A,B,C, creating the ability to move the vehicle along the directions A,B,C,D,E, including gyration R. All these variables generate a total VTOL capability.

Figure 21:
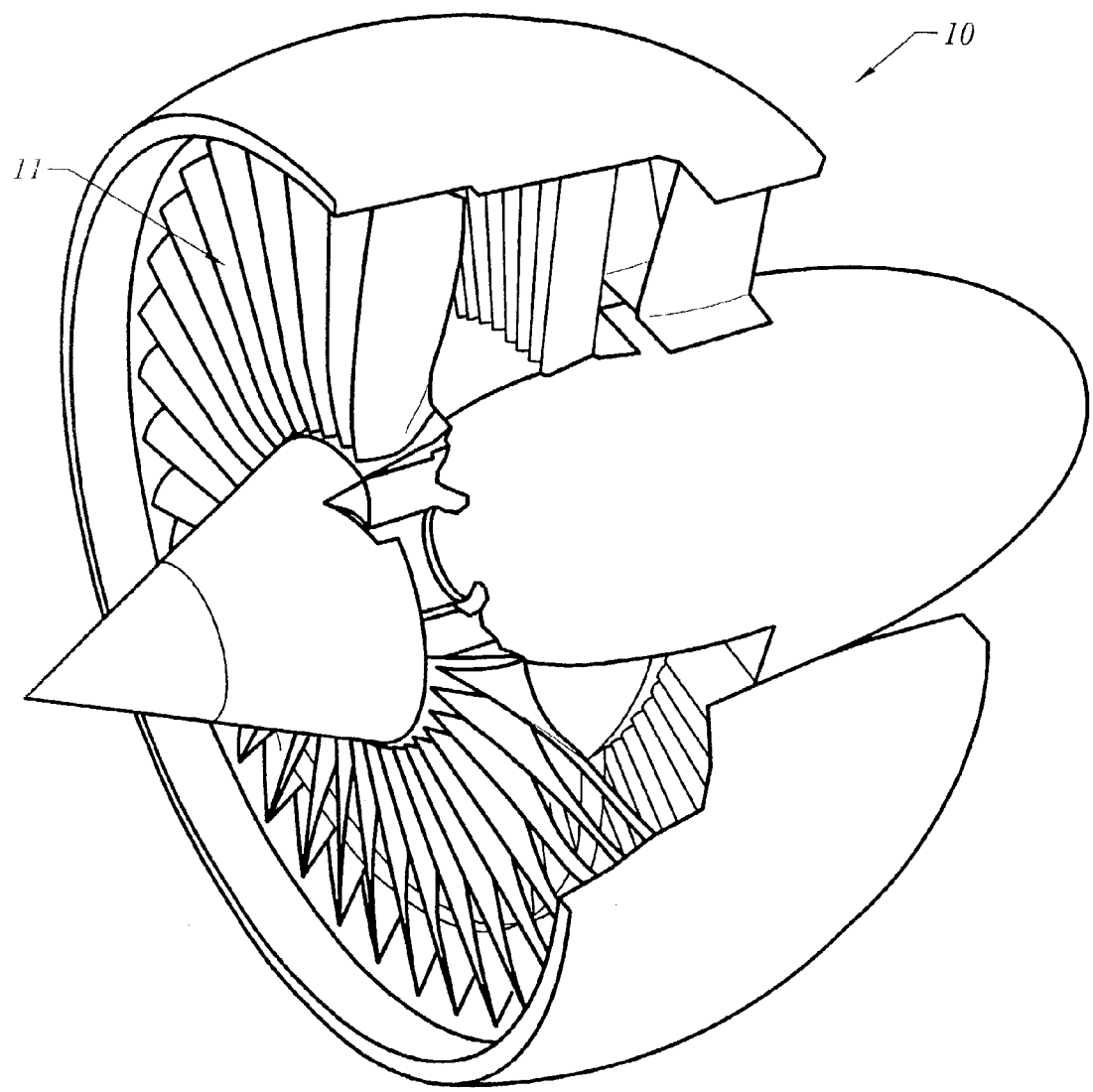
FIG. 21 is a perspective view of the turbojet of the basic type disclosed in FIG. 1.

In FIG. 21 the general turbojet engine 10 of this invention is shown in perspective, partially in cut-out section to illustrate the general three-dimensional aspects of the structural components.

Figure 22:
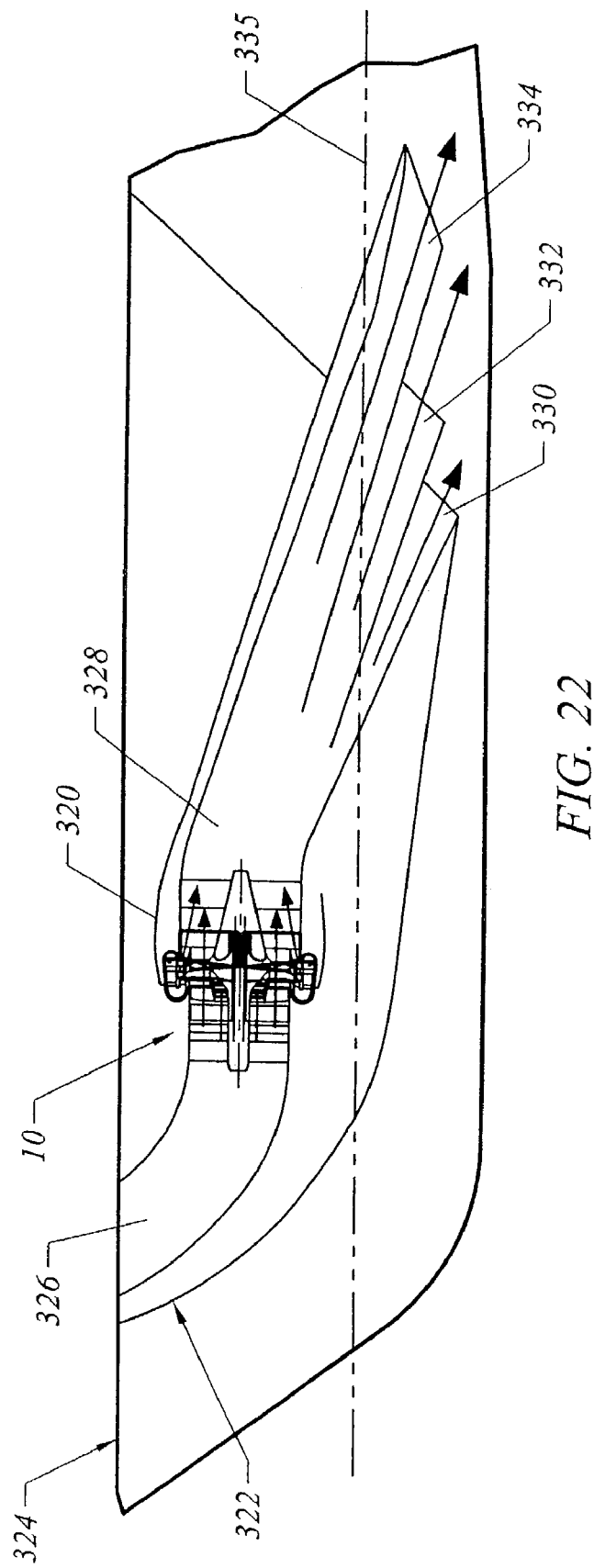
FIG. 22 is a schematic view of a turbojet engine in a marine propulsion system.

In FIG. 22 there is depicted the turbojet engine 10 preferably of a type shown in FIG. 12 as a turbojet 320 in a universal marine propulsion pod 322 for propulsion of a naval vehicle 324. The universal marine propulsion pod 322 incorporates in the naval vehicle 324 an air intake duct 326 which conducts air to the turbojet 320. A common exhaust gas and bypass air jet 328 combines combustion gases and bypass air for ejection through multiple motive gas ejectors 330, 332 and 334 located below the waterline 335.

Figure 23:
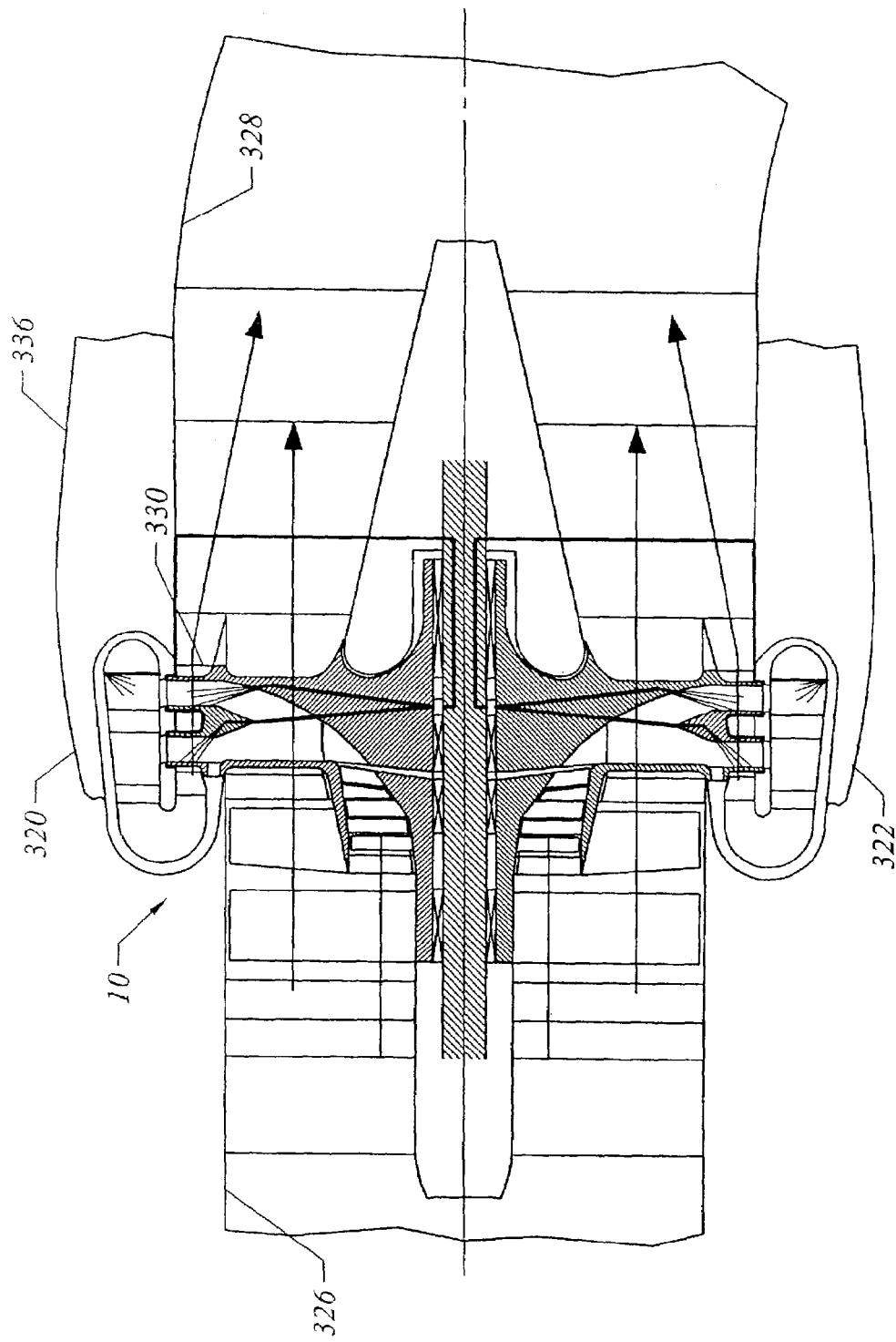
FIG. 23 is an enlarged view of the turbojet engine in the marine system of FIG. 22.

In FIG. 23 there is depicted the turbojet 320 of FIG. 22 with the turbojet engine 10 of the type shown in FIG. 12 modified for the application of a universal marine propulsion system 322. The turbojet 320 of FIG. 23 is shown with the modified housing 336 (shown in part) to provide the air intake duct 326 and the common exhaust gas and bypass air jet 328. As noted, for naval nuclear vehicles the gas turbine section 330 of the turbojet 320 is modified as a steam turbine section or replaced by an electric motor fan unit to produce the same air jet for water ejection of the motive gases.

Figure 24:
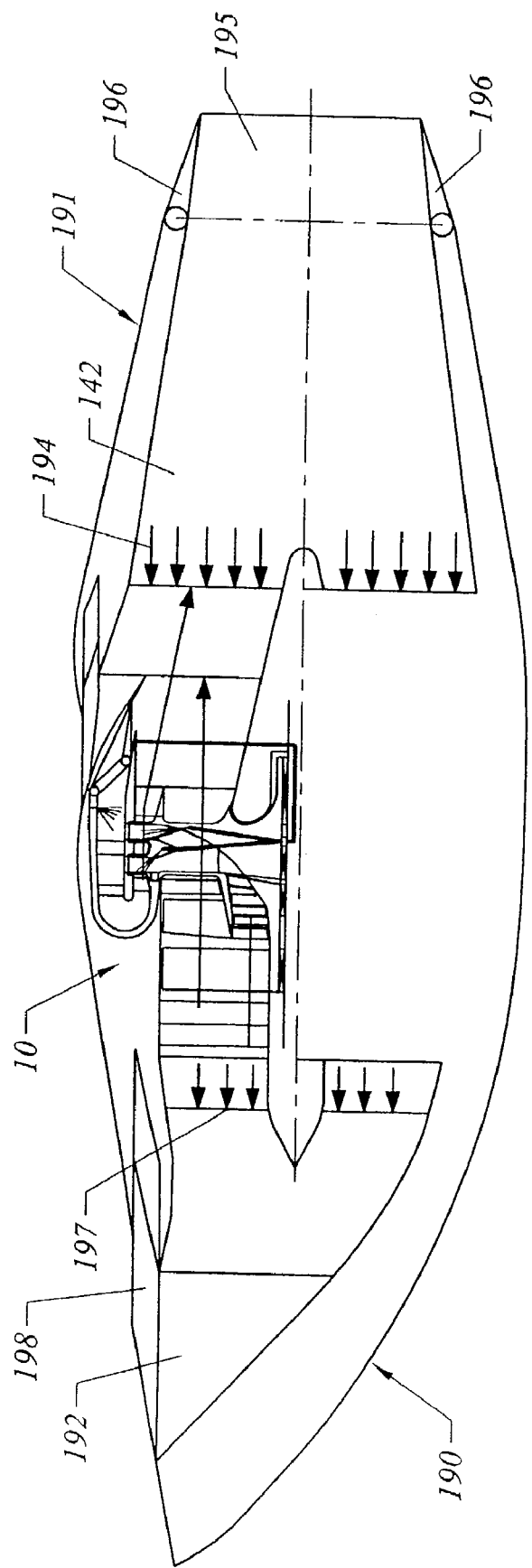
FIG. 24 is a schematic view of the turbo bypass turbofan with oxygen injectors for space propulsion.

In FIG. 24 there is depicted a turbojet engine 10 of the type shown in FIG. 12. The turbojet engine is in the form of the triple bypass turbofan pod 190, as shown in FIG. 14, modified as an intercontinental aerospace propulsion module 191 with an oxygen supply battery of liquid oxygen injectors 197. Liquid oxygen is supplied in increasing amounts to maintain combustion as the intake air diminishes at high altitudes. For stratospheric and space flight, the supplied oxygen provides the total support for fuel combustion, and with the front intake 192 and top air bypass 193 closed, the turbojet engine 10 is converted for operation as a rocket.

In all operations of the engine 10, any liquid fuels may be used, particularly including liquid hydrogen (LH2) and liquid natural gas (LNG). For commercial operation, the low-cost, high energy content of liquid natural gas is preferred. When using cryogenic fuels, the low or zero emission of the fuel coupled with the advantage in achieving adiabatic compression and, absence of a thermal signature makes the use of cryogenic fuels particularly attractive for military and aerospace applications.

Figure 25:
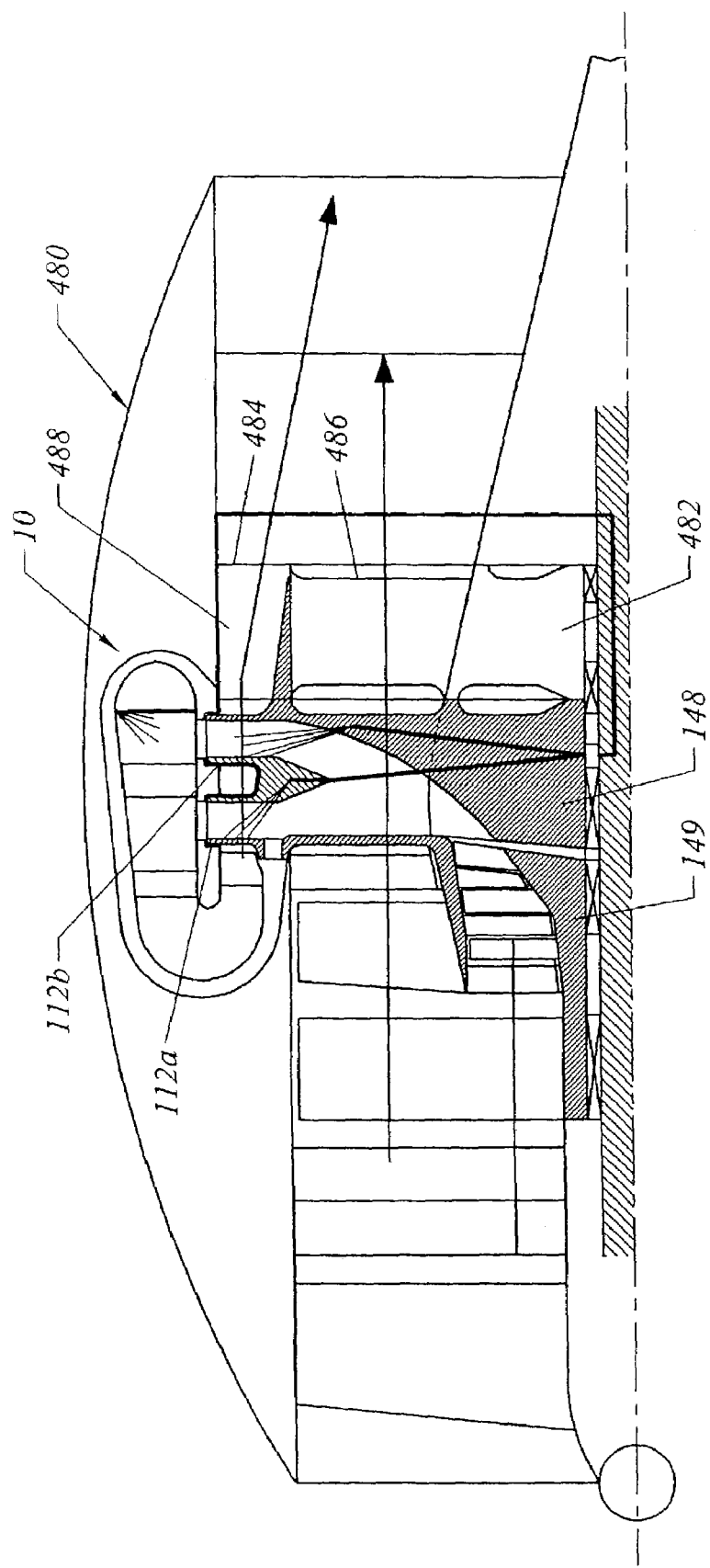
FIG. 25 is a schematic view of the turbojet engine in a three stage turbine cycle.

In FIG. 25 there is depicted the turbojet engine 10 in a turbojet pod 480 of the type described with reference to FIG. 12 having the free wheeling air turbine rotor unit 149. The turbojet pod 480 of FIG. 25 has an added free wheeling rotor unit 482 having an integral turbine 484 and fan 486. The turbine 484 has turbine blades 488 arranged downstream from the turbine blades 112a and 112b of the primary rotor unit 148 of the turbojet engine 10. The three stage turbine and added fan 486 combine to produce a high compression and increased expansion providing a higher air bypass pressure ratio for applications requiring greater thrust.

Figure 26:
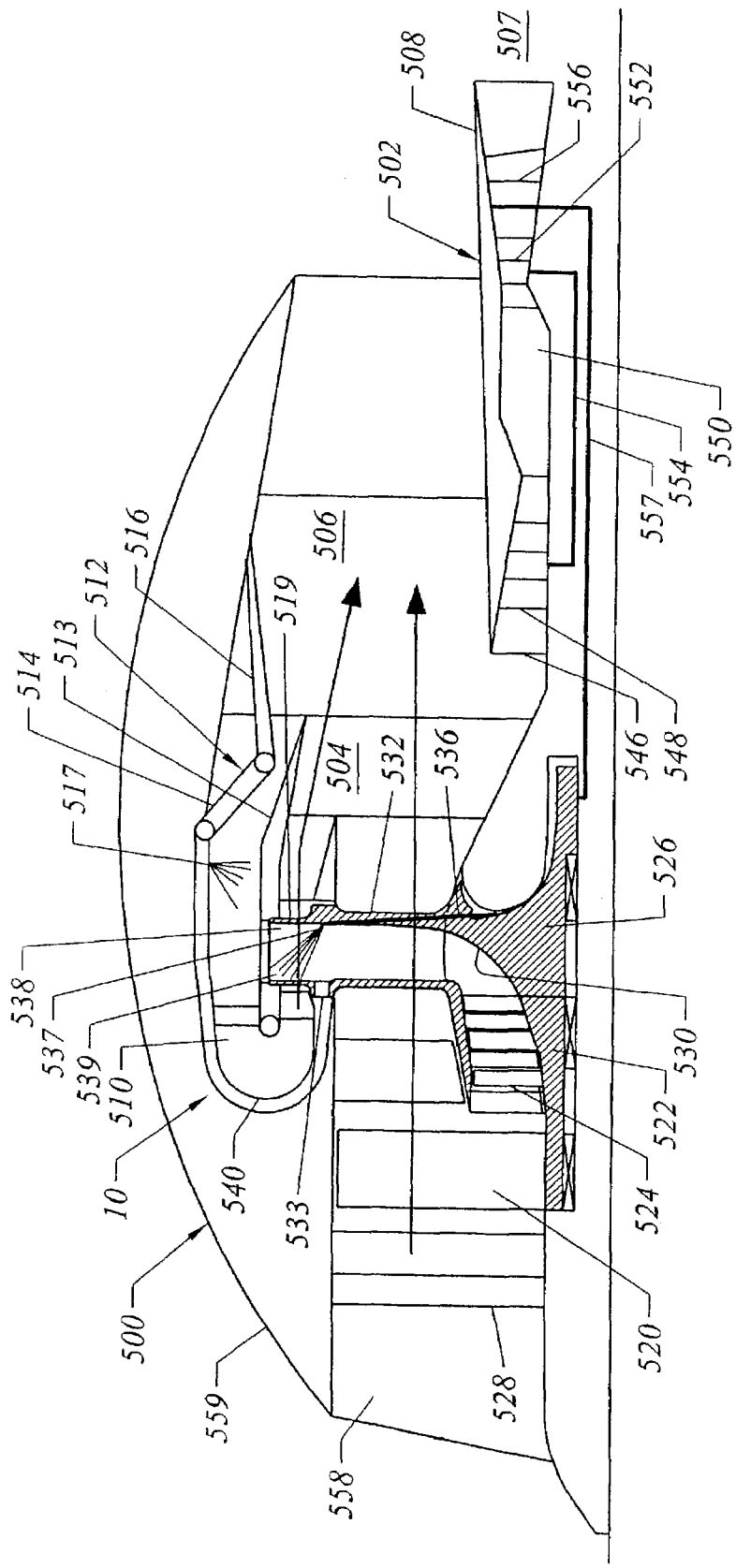
FIG. 26 is a turbojet engine in a turbo pod combined with a conventional turbojet.

In FIG. 26 there is depicted the turbojet engine 10 in a turbojet pod 500 with an added conventional axial gas turbine turbojet 502 that acts as a starter and a booster for amplification of the power of the primary turbojet engine 10. The combination of the primary turbojet engine 10 and axial conventional turbojet 502 in the turbojet pod 500 provides thrust by combining the bypass air from pathway 504 with combusted gas from pathway 506 and combusted gas expelled from a central pathway 507 from the axial turbojet 502 ejector nozzle 508.

The turbojet engine 10 is a modification of the engine in the turbojet pod 90 of FIG. 9, and includes an annular combustion chamber 510 with a variable geometry discharge nozzle 512 having an inner annular baffel 513 and outer articulated members 514 and 516. Combustion gases exiting the nozzle 512 provide a jet propulsion controlled by the variable geometry discharge mechanism and the fuel allotted to the fuel injector 517 in the combustion chamber 510.

As in the turbojet engine 10 in FIG. 11, a free wheeling fan 520 is part of a counter rotating rotor 522 that includes an added internal staged compressor 524 for further compressing air directed to the radial compressor fan rotor 526 that rotates counter to the free wheeling fan 520. Adjustable stator vanes 528 provide a pitch control for deflecting the ram air to optimize rotation of the free wheeling fan 520 and internal axial compressor 524 carried on the common rotor 522.

The radial compressor fan rotor 526 centrifuges the axially compressed air through the internal passage 530 where it is cooled by the bypass air externally traversing the integral fan 532 of the compressor fan rotor 526. Additional cooling is provided to the radial turbine blades 519 by internal fuel supply channels 536 and internal injectors 537 for injecting fuel into the internal blade tip passage 538 for generating a fuel enriched air mixture. The radially compressed air is in part diverted through the bypass apertures 533 to the perforated air plenum 540 surrounding the combustor chamber 510 and in part through the tip nozzles 539 of the turbine blades 519. The cooling bypass air provides for isothermal compression of the air in the internal passage 530. In the embodiment of FIG. 26 it is preferred that a majority of the air is directed to the air plenum 540 where it enters the combustion chamber 510 and is mixed with fuel from the fuel injector 517 for combustion the first stage injector 517. The turbulent mixture resulting from the high velocity ejection of the fuel enriched compressed air ejected through the blade tip nozzles 539 enables a stoichiometric combustion in the combustion chamber 510 producing combustion gases that flow through the annular jet nozzle 512 formed by the baffel 513 and the articulated members 514 and 516.

The conventional axial gas turbine turbojet 502 has an air intake 546 leading to an axial compressor 548 that supplies compressed air to a combustion chamber 550. The combustion gases drive a high pressure turbine 552 that drives the compressor 548 by spool shaft 554 and a low pressure turbine 556 that drives a concentric spool shaft 557 connected to the radial compressor fan rotor 526. During start-up, the axial gas turbine turbojet 502 initiates rotation of the primary turbojet engine 10 to generate the primary thrust of the turbojet pod 500.

For jet propulsion of an aircraft the velocity of the aircraft provides a ram air at the intake 558 of the pod housing 559 to drive the compressor fan rotor 522 and counter rotating radial compressor fan rotor 526. The power process of the system is amplified by the ram air proportional to the speed of the aircraft. The triple propulsion jet is provided by the bypass fan air, the combustion gases ejected from the controlled jet nozzle 512, and the gases from the ejector nozzle 508. In the combined unit of FIG. 26, the turbojet engine 10 provides ten to twenty times the thrust of the auxiliary conventional turbine turbojet 502.

Figure 27:
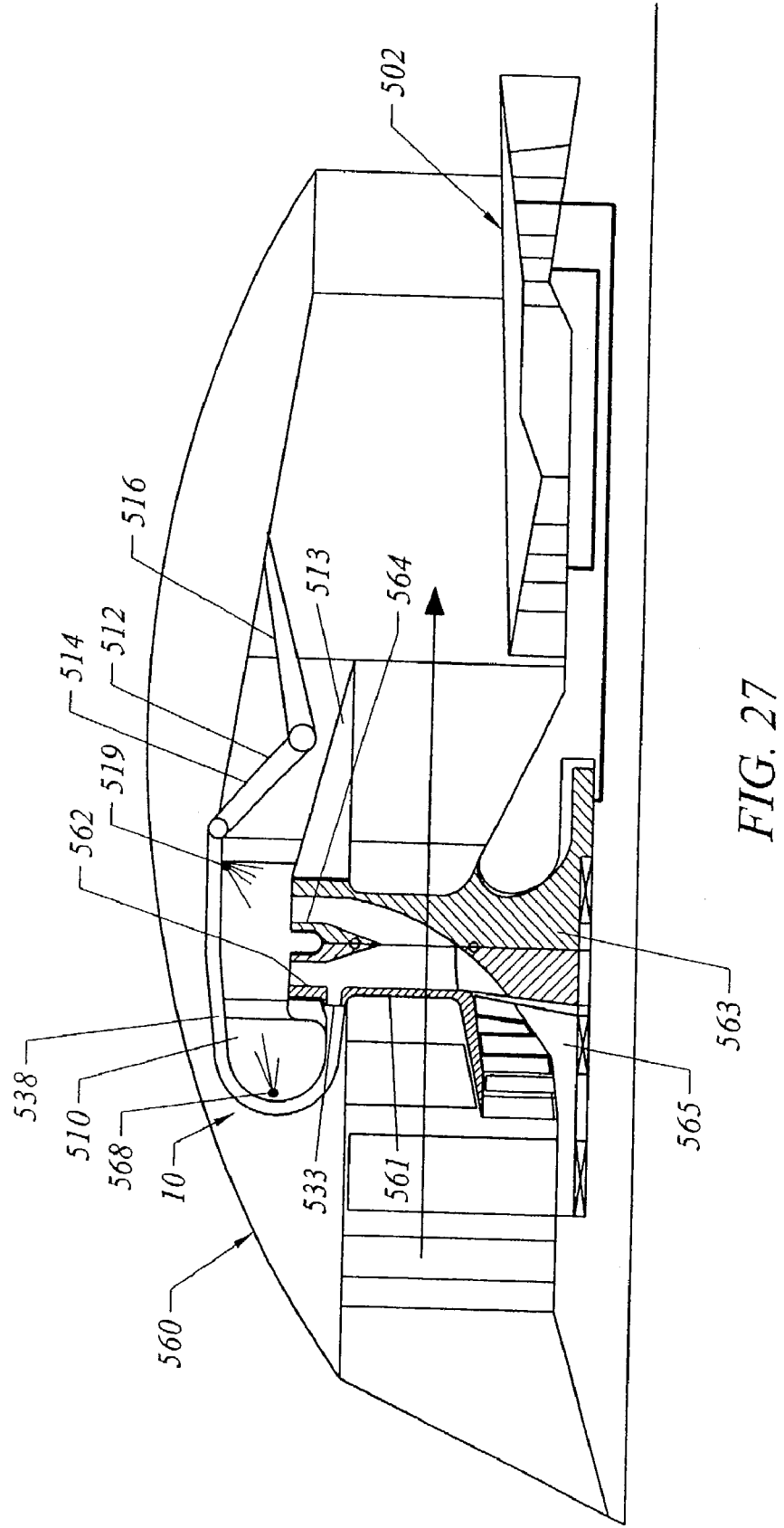
FIG. 27 is a schematic view of the turbojet engine of FIG. 26 modified to eliminate hot turbine blades.

In FIG. 27 there is depicted the turbojet engine 10 in a turbojet pod 560 with the added conventional axial gas turbine turbojet 502 that acts as a starter and booster for the primary turbojet engine 10. The turbojet engine 10 is a modification of the engine in the turbojet pod 146 of FIG. 12 with the free wheeling air turbine rotor unit 149, and includes the annular combustion chamber 510 with the variable geometry discharge nozzle 512 with inner annular baffel 513 and outer articulated members 514 and 516 of FIG. 26. In the embodiment of FIG. 27 the bypass air traversing the fan 561 of the axial and radial compressor rotor 563 provide for isothermic compression before the compressed air is ejected in the combustion chamber 510 through the two tip nozzles 562 and 564, and through the bypass apertures 533 to the perforated plenum 538. A two stage combustion process is initiated by an added fuel injector 568. In the embodiment of FIG. 27 the dual tip nozzles 562 and 564 do not provide the additional peripheral, axial turbine of the FIG. 11 embodiment. As a result, the embodiment of FIG. 27 is a totally cool rotor system in the turbojet 10 with minimum work isothermal compressors and stoichiometric combustion. This concept provides a powerful propulsion system and a thermally efficient aviation system without high temperature turbine blades.

Figure 28:
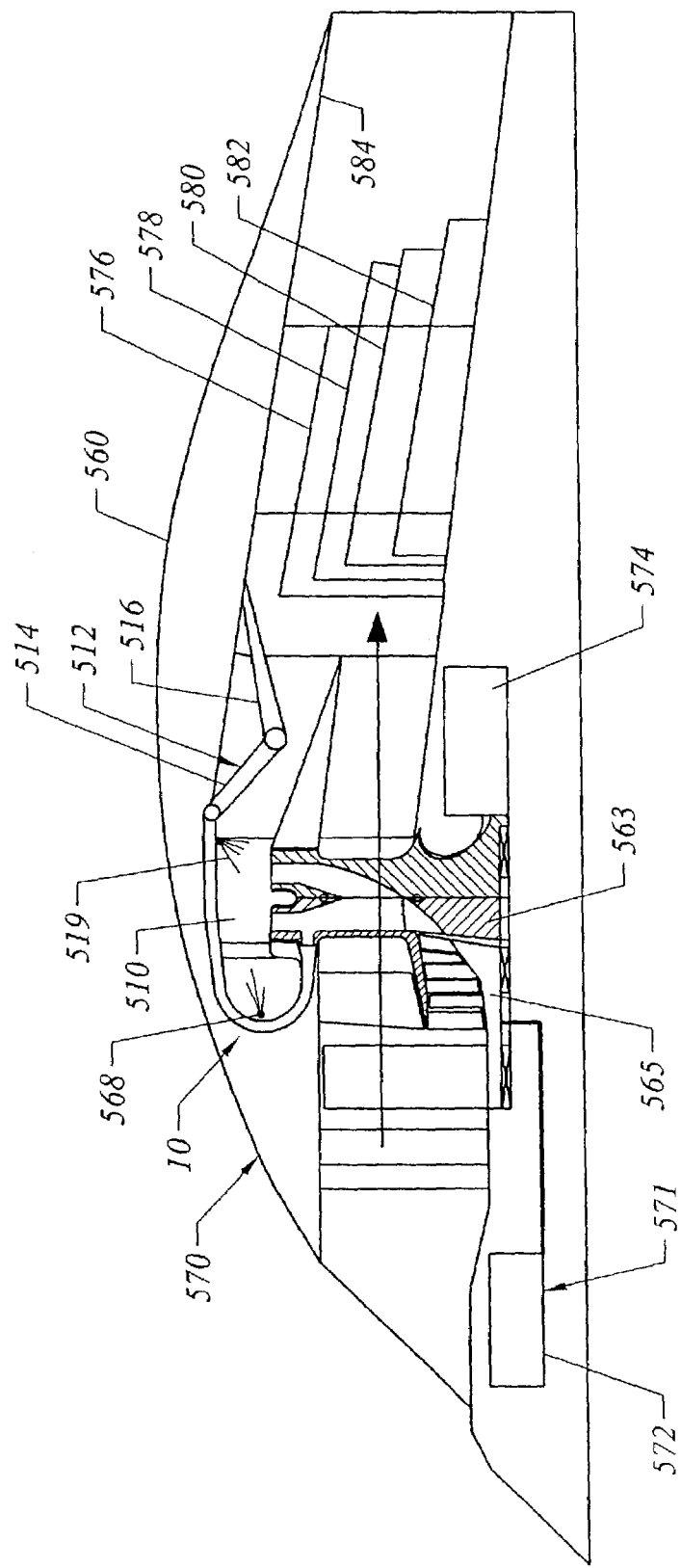
FIG. 28 is a schematic view of the turbojet engine of FIG. 27 in combination with a generic starter.

In FIG. 28 there is depicted the turbojet engine 10 in a turbojet pod 570 that is similar in construction and operation to the turbojet pod 500 of FIG. 27, without the combined conventional axial gas turbine turbojet 502. In order to initiate the counter rotation of the rotor 565 for the free wheeling fan and staged compressor and the radial compressor fan rotor 563, the turbojet engine 10 includes a conventional starter system 571 with a first generic starter 572 engaging the free wheeling rotor 565 and a generic starter 574 engaging the radial compressor fan rotor 563. The generic starters can be of any known type including compressed air, explosive charge, electric motor or other system suitable to the application. In certain applications where the turbojet pod is launched from a tube at high, velocity, the ram air may be sufficient to initiate counter rotation and in such application the starter system 571 can be omitted.

The turbojet pod 570 of FIG. 28 is a total ram air driven turbine with isothermal cooled compressor rotors and zero hot moving parts. The pod includes a battery of concentric ejector tubes 576, 578, 580 and 582 which focus the nozzle effect of the ejected gases which are in part guided by the members 514 and 516 of the variable geometry discharge nozzle 512 of the combustion chamber 510. The partially mixed combustion gases and bypass air passing through the ejector tubes 576–582 are finally ejected from the common exhaust nozzle 584 of the pod housing 560.

Figure 29:
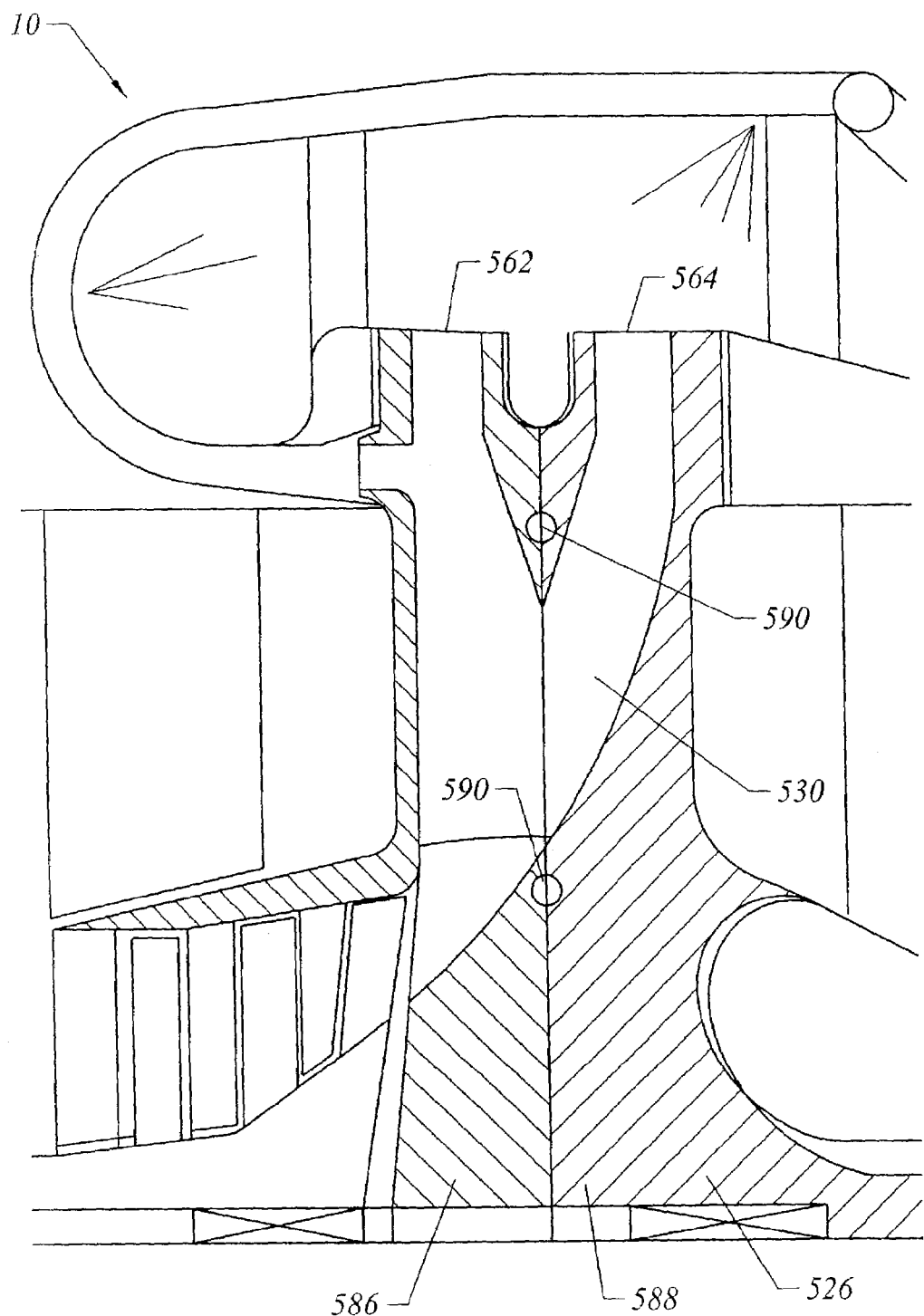
FIG. 29 is a schematic view of the turbojet engine of FIGS. 27 and 28 enlarged to show the split rotor construction.

In FIG. 29 there is depicted an enlarged partial view of the radial compressor fan rotor 563 that is included in the turbojet engines 10 of FIGS. 25 and 27. The radial compressor fan rotor 563 is fabricated in two segments 586 and 588 with an O-ring seal 590 around the bifurcating internal passage 530 of each projecting nozzle 562 and 564 of the rotor 563.

Figure 30:
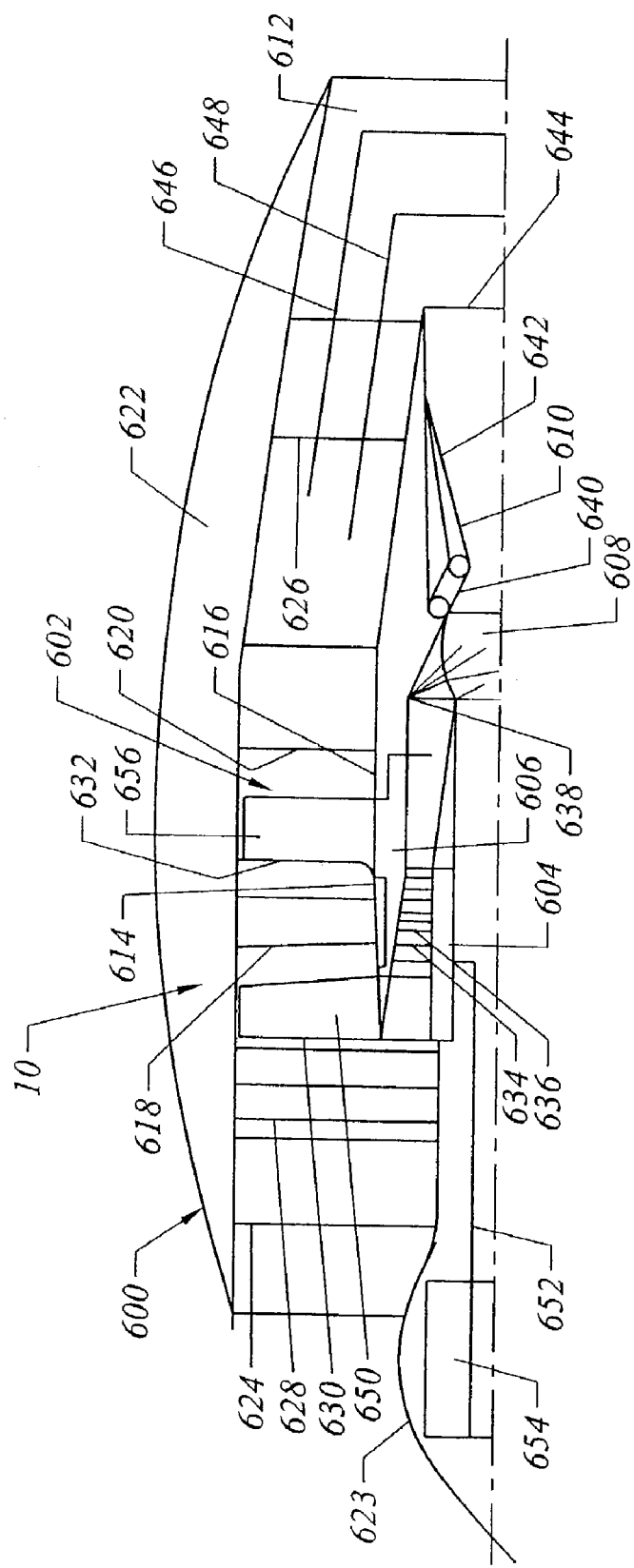
FIG. 30 is a schematic view of a modified turbojet engine eliminating hot turbine blades.

In FIG. 30 there is depicted a turbojet engine 10 in a turbojet pod 600 with a counter rotating fan and compressor assembly 602 having a first fan and compressor rotor 604 and a second counter rotating fan and compressor rotor 606. The rotors 604 and 606 of the counter rotating fan and compressor assembly 602 operate as axial counter rotating air turbines driven by ram air in which the rotary components are isolated from the hot gases of combustion providing the first low temperature turbojet engine. High temperatures in the turbojet engine 10 are isolated to a combustion chamber 608 and a variable geometry ejection nozzle 610 before the jet of combustion gases is combined in a jet propulsion stream with the bypass fan air and finally ejected from the common exhaust nozzle 612.

The outer ram air turbine rotor 606 is supported on bearings 614 and 616 of struts 618 and 620 connected to the pod housing 622. A central structure 623 is additionally supported by struts 624 and 626. Adjustable stator vanes 628 direct ram air first to the fan 630 of rotor 604 and then to counter rotating fan 632 of rotor 606. The air turbines effectively drive the staged counter rotating axial compressors 634 and 636 to compress a part of the intake ram air which is supplied to the combustion chamber 608 where injectors 638 inject fuel. The articulated members 640 and 642 of the variable geometry ejection nozzle 610 control the core stream of combustion gases ejected from the reaction nozzle 644. Ejector tubes 646 and 648 guide and blend the flow of bypass air into the stream of combustion gases before final mixing at the common exhaust nozzle 612.

To initiate operation of the ram air turbines, the rotor 604 carrying the blades 650 of the first fan 630 is rotated by a shaft 652 operable connected to a generic starter 654. Once rotation is initiated the forced air counter rotates the blades 656 of the second fan 632. The connected counter rotation axial compressors 634 and 636 which are integral with the respective fan rotors 604 and 606 then compress a portion of the intake ram air for combustion of fuel in the combustion chamber 608. The combustion gases are ejected through the variable geometry ejection nozzle 610 and the common exhaust nozzle, as noted above.

Figure 31:
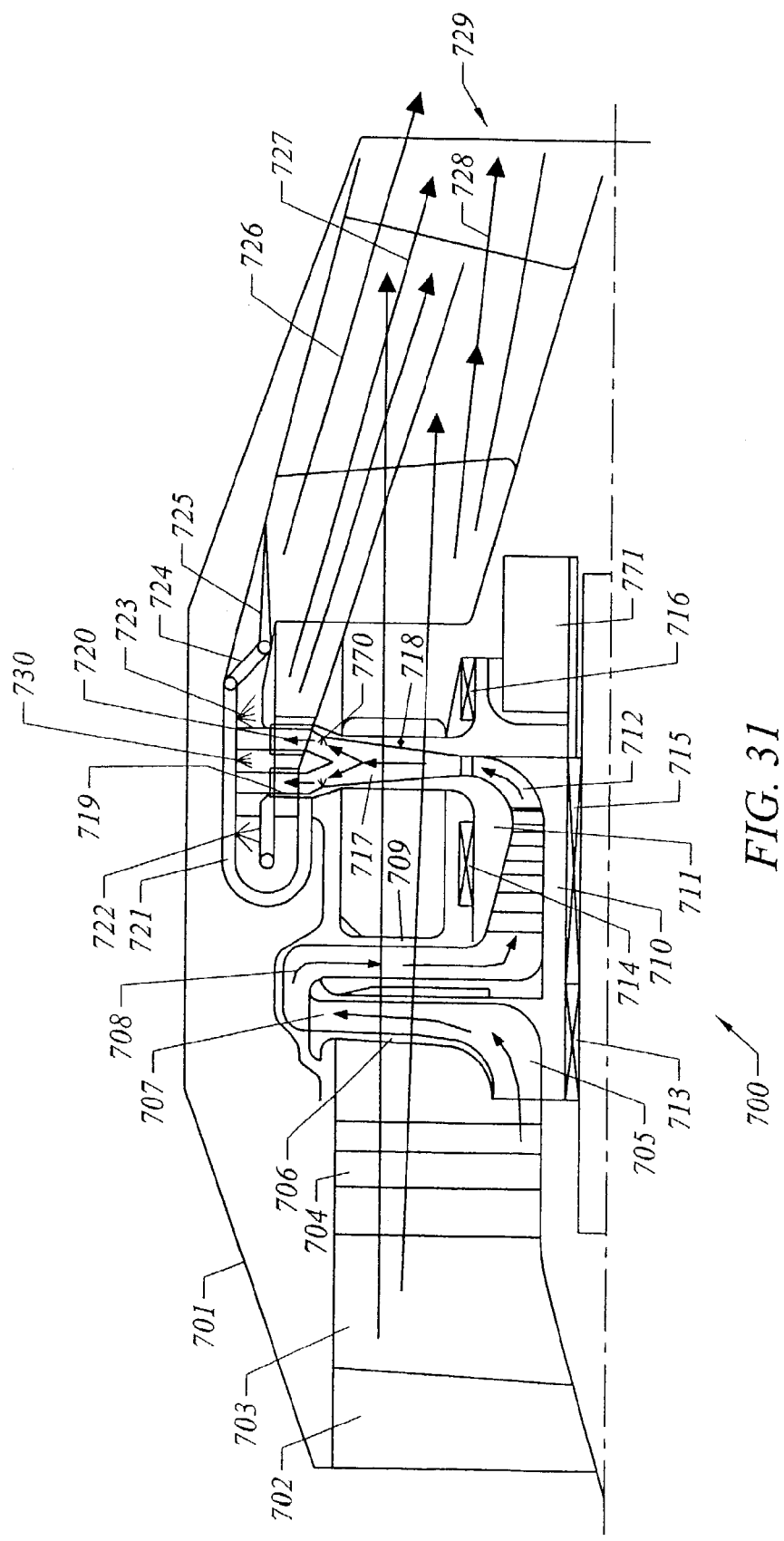
FIG. 31 is a schematic cross-sectional view of an ultra high pressure ratio, ram-air, turbo rocket engine with peripheral tip turbines and a parallel combustion.

Referring to FIG. 31, the first embodiment of the high altitude turbojet engine is designated generally by the reference numeral 700. The turbojet engine 700 includes a body 701, having an air intake 702, struts 703, and variable geometry air guides 704. The air guides 704 are located proximate a front rotor 705, which includes a ram air turbine 706 having hollowed blades 707, forming a centrifugal isothermal air compressor. Cold compressed air is supplied through the hollowed struts, 708, which act like a supplementary air intercooler 709 before the compressed and cooled air is supplied to counter rotary compressor with stages 710, 711 and 712, supported by bearings 713, 714 and 716.

A second rotor centrifugal compressor 717, is an air by-pass fan 718, provided with hollowed peripheral gas turbine blades 719 and 720. A starter 771 initiates the compression and turbine process.

A peripheral concentric combustion chamber 727, is provided with two zones for combustion, a first zone, 722, for primary combustion and a second zone 723 for total combustion which is activated in the rocket mode of operation when the combustion chamber is opened for by-pass rocket jet gas propulsion through the variable geometry exit nozzle 724, 725, producing a pure rocket propulsion jet 726.

The exit gases from the propulsion jet 727 of the gas turbine, are mixed with the gases from the pure rocket propulsion jet 726 and the air from the by-pass air jet 728, forming the final total propulsion jet 729.

The isothermal compression in both rotors 707 and 717, and the chilling in the intercooler 709 provide the coolest compressed air for the hollowed gas turbine blades 719, 720. The gas turbine blades are provided with internal fuel injectors 770, as described in greater detail with relation to previously described embodiments. The compressor and intercooler cooling and the internal fuel injection combine to create the most intensive cooling capable for the gas turbine blades, and enable combustion to work at maximum stoichiometric level. At very high altitude, when the oxygen density in the air is reduced, liquid oxygen injectors 730 are activated to inject oxygen enriching the compressed air for maintaining a maximum combustion capacity.

Figure 32:
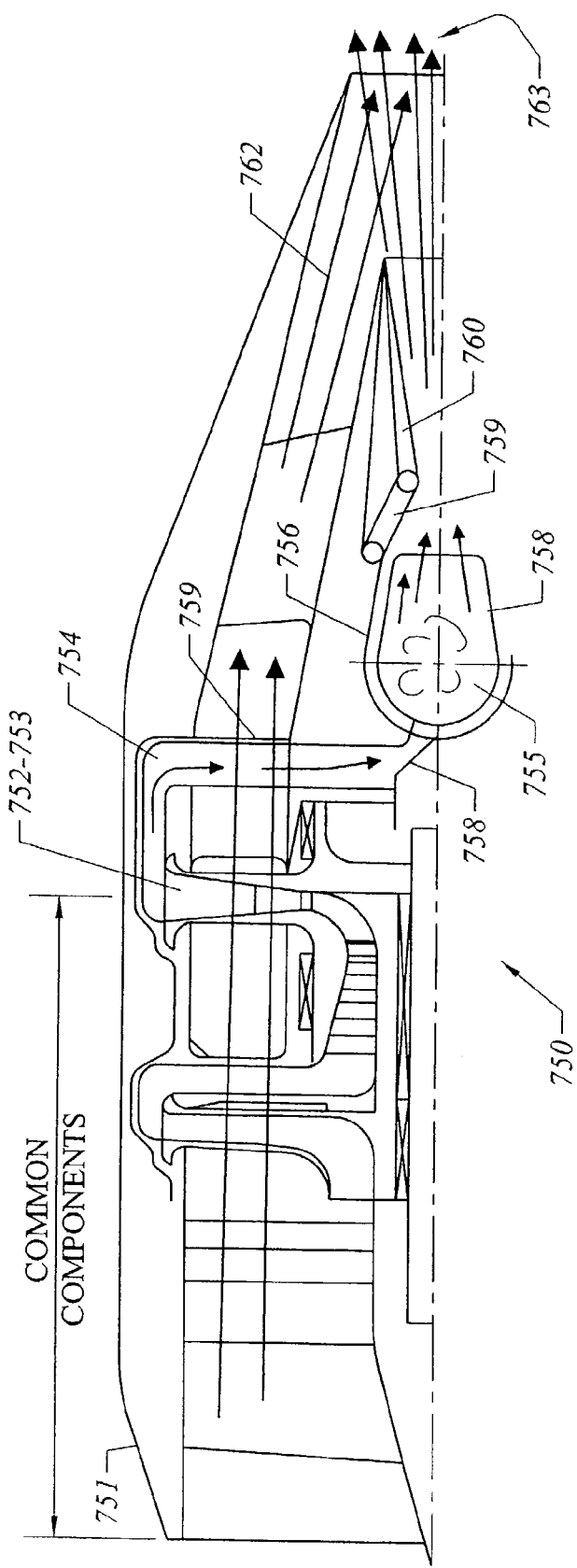
FIG. 32 is a schematic cross sectional view of an ultra high pressure ratio, ram-air, turbo rocket engine with central combustion and elimination of hot rotary components.

Referring to the embodiment in FIG. 32, the high altitude turbojet engine indicated generally by the number 750, is a derivative solution from the embodiment 700 of FIG. 31. The turbojet engine has a body 751, includes all the ram-air frontal components of the FIG. 31, but including a second ram-air turbine 752, having hollowed blades acting as a final isothermal centrifugal compressor 753 supplying compressed air through hollowed struts 754, conducting the cooled air to a central combustion chamber 755, surrounded by an air plenum 756, spaced from a combustion chamber liner 758, which is preferably made from ceramic.

The combusted jet rocket gases are controlled by a variable geometry exit nozzle 759, 760, optimizing a constant pressure ration for combustion at all speeds, which in turn conserves the maximum thermal efficiency during all regimes of flight.

The rocket gas jet 761 is finally mixed with by-pass air flow jet 762, forming the final combined propulsion jet 763.

An important characteristic of this air-rocket-bypass propulsion system is the total absence of any hot moving parts, which allows low cost to be combined with a maxim absolute thermodynamic performance.

Figure 33:
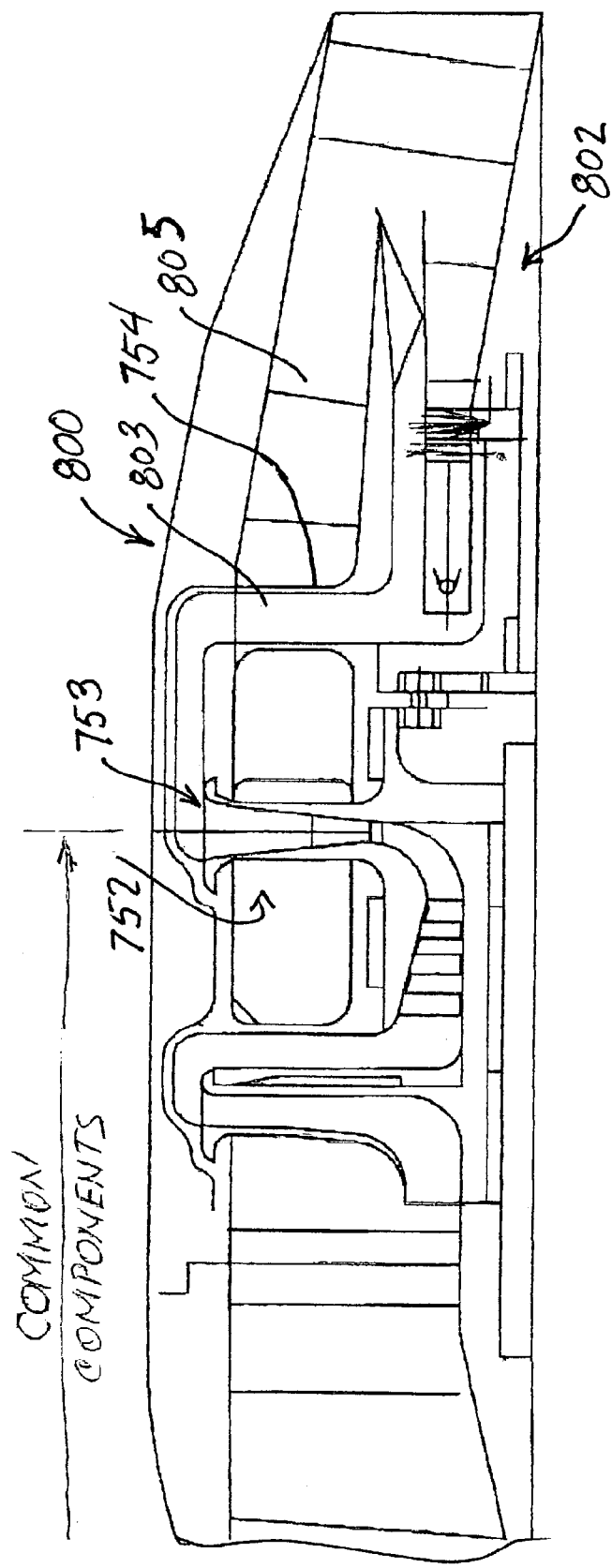
FIG. 33 is a schematic cross-sectional view of an ultra high pressure ration ram-air turbo rocket engine with added central combustion system with convertible turbine/rocket propulsion.
Figure 34:
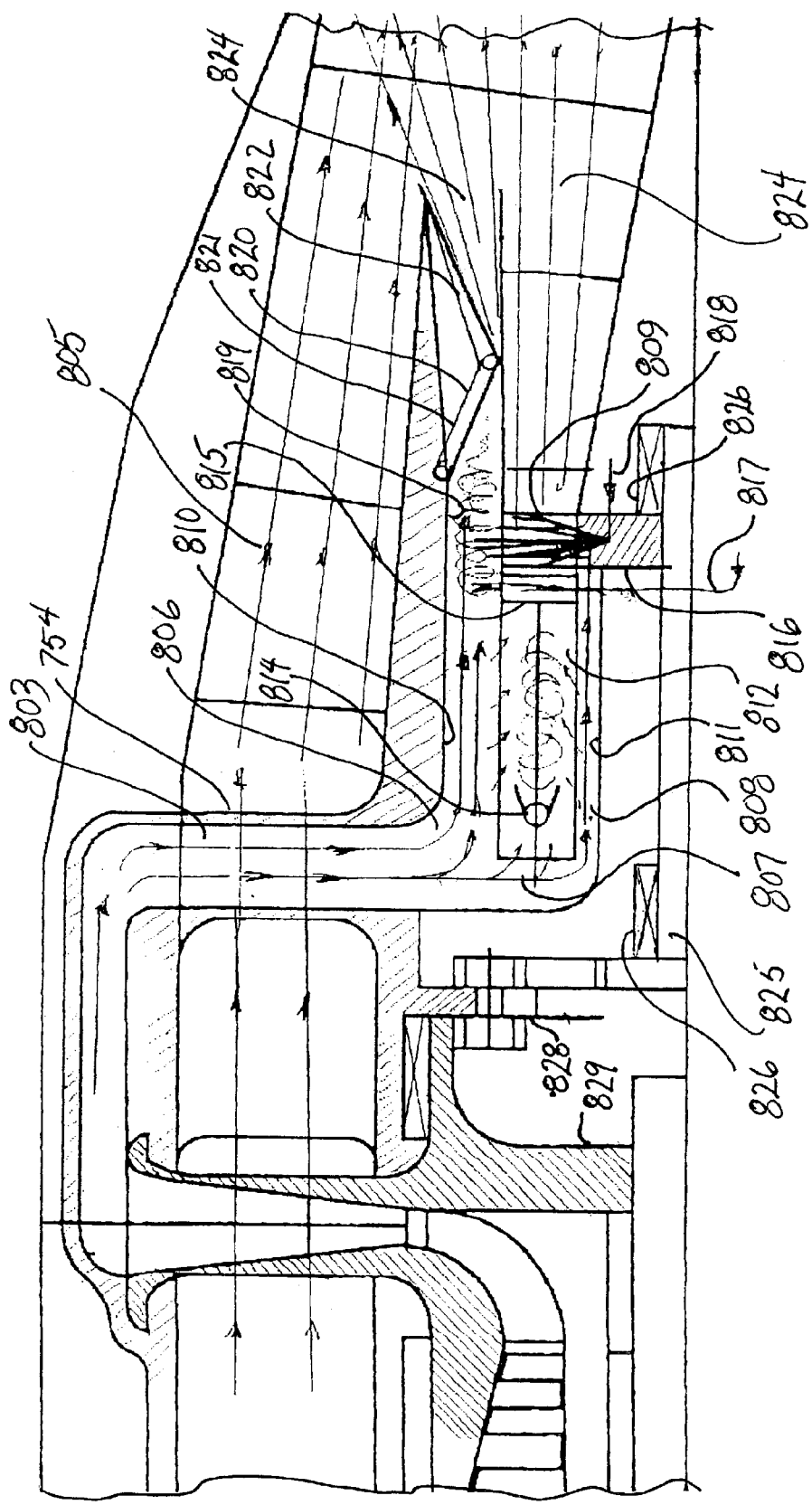
FIG. 34 is an enlarged cross-sectional view of a portion of the engine of FIG. 33.

Referring to FIG. 33, a third embodiment of the high altitude turbojet engine is designated generally by the reference numeral 800. The turbojet engine 800 has forward components that are the same as in the engine 750 with different internal aft components forming a central combustion system 802 for convertible turbine/rocket propulsion. In FIGS. 33 and 34 the ram-air turbine 752 and final isothermal centrifugal compressor 753 supply compressed air through first air passages 803 in the hollowed struts 754 and by-pass passage 805 around the struts 754.

As shown in greater detail in FIG. 34, the air passage 803 in the struts 754 divides into three channel 806, 807 and 808 formed by a concentric peripheral air plenum 810, a concentric internal air plenum 811, and an interposed perforated annular combustion chamber 812 concentric with the peripheral and internal air plenums 810 and 811. Fuel injectors 814 inject fuel into the annular combustion chamber 812 for generating combustion gases which produce the motive gases for driving a hollow bladed turbine 816. Hollowed fuel nozzles 815 are arranged transversely across the annular combustion chamber 812 from internal air plenum 811 to peripheral air plenum 810 and are equipped with internal injectors 817 for delivering a fuel-air mixture to a peripheral combustion chamber 819 at the end of the concentric peripheral air plenum 810. The compressed air and injected fuel in full nozzles 815 cool combustion gases in annular combustion chamber 812 before driving hollowed turbine blades 809 of a central turbine 816. The hollowed turbine blades 809 accept compressed air from internal air plenum 811 and mix with fuel from internal fuel nozzles 818 before centrifugal ejection into peripheral combustion chamber 819. Here the mixture is combined with air in the peripheral air plenum and air with allotted fuel from the hollowed fuel nozzles 815. The combusted mixture is ejected through a variable geometry discharge nozzle 820 with articulated members 821 and 822 that control the flow of the rocket jet 824, which is a primary source of propulsion.

The rocket jet 824 combines with ram-air in the by-pass passage 805 and the turbine driving combustion gases from the annular combustion chamber 812 which exit in an inner discharge jet 824.

A turbine shaft 825 supported by bearings 826 provides a power take-off shaft for a drive mechanism such as a gear box drive 828 to connect to the centrifugal compressor 829 producing the basic air compression for starting the combustion. The gear box drive 828 is also connected to an electric starter 771 (not visible) as schematically shown in FIG. 32.

In the turbojet engine 800 of FIGS. 33 and 34, the isothermal compression as described with reference to FIG. 32 is dependent on air speed and with air becoming progressively higher in compression at higher speeds. At high flying speed, ram-air compression by the ram-air turbines diminishes the power required from the aft gas turbine 816. At the elevated speeds of operation, the parallel rocket propulsion from the peripheral combustion chamber 819 develops the main thrust. By continuous control of the variable geometry discharge nozzle 820 a constant pressure ratio is enabled for maximizing the thermal efficiency and maintaining this maximized thermal efficiency at all ranges of operation from partial to full loads and at all practical flying speeds.

Figure 35:
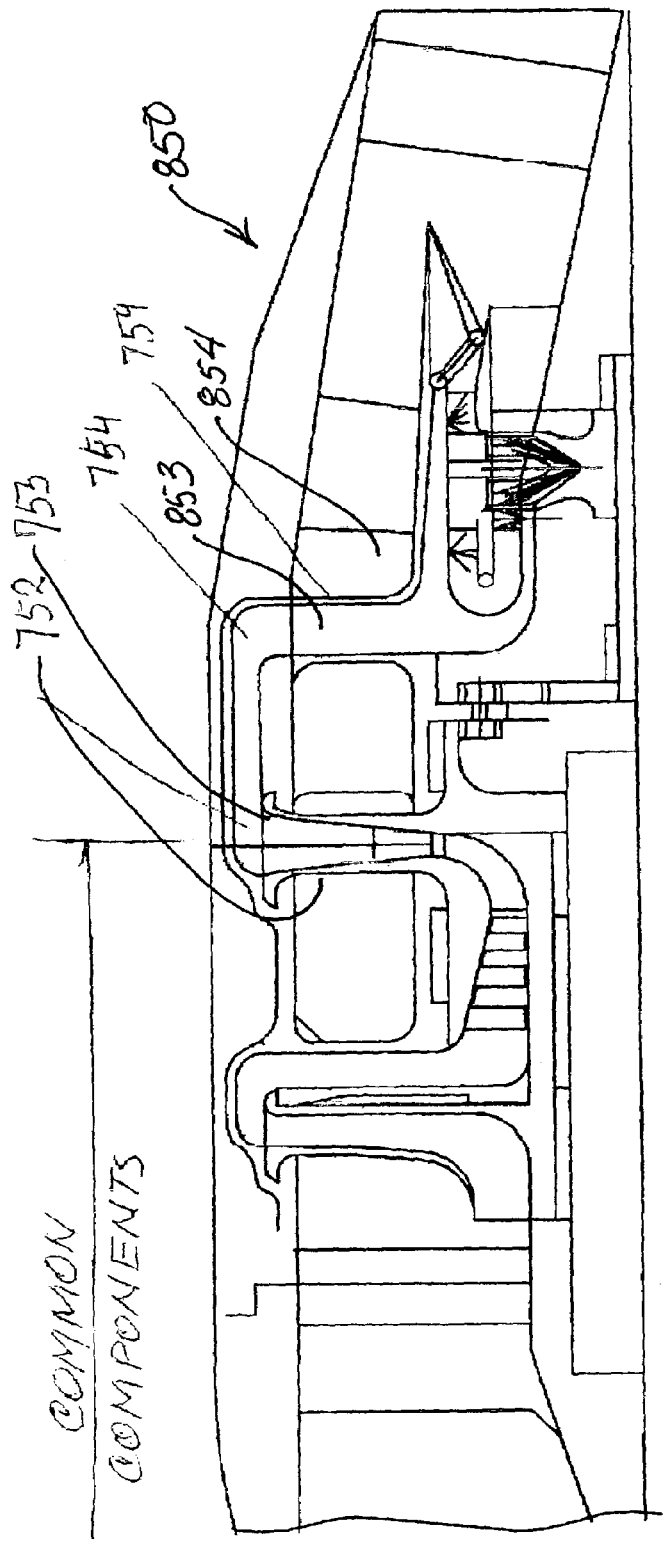
FIG. 35 is an ultra high pressure ration ram-air turbo rocket engine with an alternate added central combustion system with convertible turbine/rocket propulsion.
Figure 36:
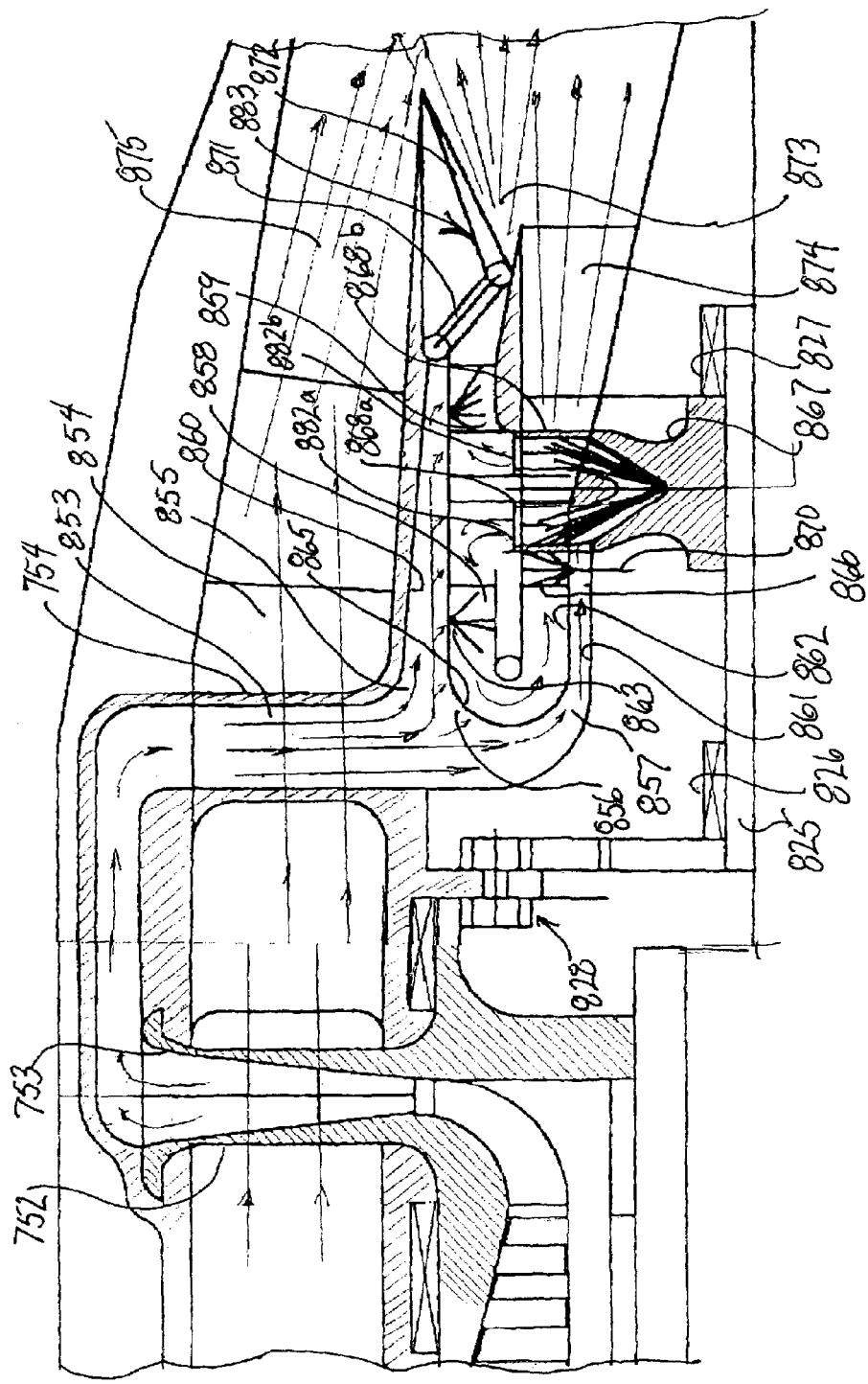
FIG. 36 is an enlarged cross-sectional view of a portion of the engine of FIG. 35.

Referring now to FIG. 35, a fourth embodiment of the high altitude turbojet engine is designated generally by the reference numeral 850. The turbojet engine 850 has forward components that are also the same as in the engine 750, with different internal aft components forming a central combustion system 852 for convertible turbine/rocket propulsion. In FIGS. 35 and 36 the ram-air turbine 752 and final isothermal centrifugal compressor 753 again supply compressed air through first air passages 853 in the hollowed struts and by-pass air passage 854 around the struts 754.

As shown in greater detail in FIG. 36, the air passage 853 in the struts 754 divides into three channels 855, 856 and 857 formed by a concentric peripheral air plenum 860, a concentric internal air plenum 861 and an interposed, reverse-flow, perforated annular combustion chamber 862 concentric with the peripheral air plenum 860 and the concentric internal air plenum 861.

The annular combustion chamber 862 is provided with a primary combustion zone 858 and a secondary combustion zone 859. The primary combustion zone 858 has a fuel injector 863 and a reverse flow conduit 865 for conducting the combustion gases from the primary combustion zone 858 to the transverse air fuel nozzles 866 with internal fuel injectors 870 and to a central two-stage gas turbine 867. The two-stage gas turbine 867 has hollowed gas turbine blades 868a and 868b and internal fuel injectors 869. Air enters a side passage 880 in the lead blades 868a from concentric internal air plenum 860 and mixes with fuel in a mutual hollow zone 881 before ejecting at high velocity from blade tips 882a and 882b, as shown in FIG. 36.

The air-fuel mixes cool the transverse air/fuel nozzles and turbine blades 868a and 868b. The centrifugal air/fuel mixture from the turbine blades 868a and 868b, provides a thorough mixing and efficient combustion in the reverse flow annular combustion chamber 362 which extends to the primary and secondary combustion zones 863 and 864.

In a manner similar to the embodiment of FIGS. 33 and 34, a variable geometry discharge nozzle 883 having articulated members 871 and 872 controls the rocket jet 873 which mixes with the discharge gases of the turbojet 874 and the ram-air by-pass jet 875 on final discharge. The control of the variable geometry discharge nozzle to produce essentially a constant pressure ratio results in maximizing the thermal efficiency at all loads and speeds of flight.

The embodiment of FIGS. 35 and 36 utilize the same drive shaft 825, bearings 826 and 827, and gear drive 828 with connected starter 771 (not shown) as in the embodiment of FIGS. 33 and 34.

Both embodiments are designed to allow the engine operation to achieve stoichiometric combustion producing an absolute maximum power density with appropriate cooling of critical components for efficient operation within thermal limits. With the previously described isothermal compression achieving ratios of 100–200, a maximum thermal efficiency in the 80% range can be achieved.

The turbojet engines 800 and 850 are designed for efficient operation at subsonic, supersonic speeds integrating turbofan, turbojet and rocket propulsions as a revolutionary concept.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A turbojet engine comprising:
a turbojet housing structure with an air intake and a common jet ejection nozzle,
a rotor disk unit having a fan unit with a fan portion and a peripheral turbine portion, the fan portion having fan blades with internal centrifugal compressor cells with openings to the air intake and the turbine portion having turbine blades extending from the fan blades, the turbine blades having internal passages communicating with the compressor cells and having radial open tips wherein the rotor disk unit has fuel channels to the internal passages of the turbine blades, wherein fuel injected into the turbine blades cools the compressed air and turbine blades, and,
a peripheral combustion chamber around the radial tips of the turbine blades constructed to direct combustion gases back around to the turbine blades with at least one fuel injector and nozzles that discharge combustion gases between turbine blades of the rotor disk unit wherein air that bypasses the combustion chamber flows through the fan unit between the fan blades cooling air flow compressed in the centrifugal compressor cells that with fuel injected into the turbine blades is radially ejected into the combustion chamber from the tips of the turbine blades, wherein combustion gases passing between the turbine blades mix with the bypass air passing between the fan blades in the common jet ejection nozzle.

2. The turbojet engine of claim 1 wherein the combustion chamber has a perforated air plenum and the turbine blades have a side aperture in communication with the air plenum wherein a part of the air compressed in the centrifugal compressor cells of the fan blades passes through the aperture to the air plenum.

3. The turbojet engine of claim 2 wherein the rotor disk unit includes an axial compressor that compresses air entering the centrifugal cells and turbine blades of the rotor disk unit.

4. The turbojet engine of claim 2 wherein the turbojet structure includes a counter rotating axial compressor with an electric motor that drives the axial compressor for compressing air entering the centrifugal cells and turbine blades of the rotor disk unit.

5. The turbojet engine of claim 4 wherein the turbojet structure includes an electric generator connected to the rotor disk unit for powering the motor.

6. The turbojet engine of claim 5 including a controller for controlling the speed of the axial compressor.

7. The turbojet engine of claim 2 having an added front fan with connected axial compressor blades on the rotor disk unit, and stator fan blades and stator compressor blades connected to the turbojet structure.

8. The turbojet engine of claim 2 wherein the rotor disk unit comprises a fan-compressor-turbine rotor unit having dual hollow turbine blades for a two stage turbine cycle and nozzle blades separating the two stages of the dual hollow turbine blades.

9. The turbojet engine of claim 8 wherein the fan-compressor-turbine rotor unit has an added front fan with connected axial compressor blades on the rotor unit, and stator fan blades and stator compressor blades connected to the turbojet structure.

10. The turbojet engine of claim 8 having a front free wheeling air turbine with a counter rotating free wheeling air turbine rotor unit with air turbine blades that drive the air turbine rotor unit and axial compressor blades, wherein the rotor disk unit has axial compressor blades that rotate counter to the axial compressor blades of the free wheeling air turbine unit for precompression of air entering the fan-compressor-rotor unit.

11. The turbojet engine of claim 10 wherein the combustion chamber has a variable geometry bypass discharge nozzle for a convertible cycle.

12. The turbojet engine of claim 1 in combination with an axial gas turbine turbojet wherein the axial gas turbine turbojet has a turbine rotatabley connected to the rotor disk unit for start-up of the turbojet engine and boosting the power of the combination system.

13. The turbojet engine of claim 12 wherein the axial gas turbine turbojet is centrally located in the turbojet structure and has an ejector nozzle for ejection of combustion gases into the stream of bypass air and combustion gases from the common ejection nozzle of the turbojet engine.

14. The turbojet engine of claim 13 wherein the peripheral combustion chamber includes a variable geometry discharge nozzle wherein part of the combustion gases exit the variable geometry discharge nozzle and mix with the bypass air without driving the turbine blades of the rotor disk unit.

15. The turbojet engine of claim 14 having a front free wheeling air turbine with a counter rotating free wheeling air turbine rotor unit with air turbine blades that drive the air turbine rotor unit and axial compressor blades, wherein the rotor disk unit has axial compressor blades that rotate counter to the axial compressor blades of the free wheeling air turbine unit for precompression of air entering the fan-compressor-rotor unit.

16. The turbojet engine of claim 1 in combination with an aircraft wherein the turbojet structure is a pod containing the turbojet engine, the pod gimbal structure connecting the pod to the aircraft.

17. The turbojet engine of claim 16 wherein the combination includes multiple turbojet engines each engine being contained in a pod that has a gimbal structure connecting the pod to the aircraft.

18. The turbojet engine of claim 1 in combination with a marine vessel wherein the turbojet structure is attached to the vessel at a location that the common ejection nozzle is positioned to eject gases into the water.

* * * * *